United States Patent [19]

Lymer et al.

[11] Patent Number: 4,936,649
[45] Date of Patent: Jun. 26, 1990

[54] DAMAGE EVALUATION SYSTEM AND METHOD USING OPTICAL FIBERS

[76] Inventors: John D. Lymer, 127 Melrose Avenue, Toronto, Ontario, Canada, M5M 1Y8; Neil D. W. Glossop, 6 Cactus Avenue, Willowdale, Ontario, Canada, M2R 2R5; W. Dayle Hogg, 1609 Meadowfield Place, Orlenas, Ontario, Canada, K1C 5V3; Raymond M. Measures, 16 Flowerdale Road, Thornhill, Ontario, Canada, L3T 4J4; Roderick C. Tennyson, 5 Framingham Drive, Thornhill, Ontario, Canada, L3T 4H2

[21] Appl. No.: 301,294

[22] Filed: Jan. 25, 1989

[51] Int. Cl.[5] .................. G02B 6/02; H01J 5/16; C03B 23/20; B44C 1/22
[52] U.S. Cl. ................. 350/96.29; 350/96.15; 350/96.30; 350/96.33; 350/320; 250/227.14; 65/4.1; 65/4.2; 65/31; 156/625; 156/632; 156/158; 219/121.68
[58] Field of Search ............ 350/320, 96.10, 96.15, 350/96.19, 96.20, 96.29, 96.30, 96.33; 250/227; 156/625, 632, 158; 65/3.1, 3.11, 4.1, 4.2, 4.3, 31; 219/121.68

[56] References Cited

U.S. PATENT DOCUMENTS

| | | | |
|---|---|---|---|
| 4,360,272 | 11/1982 | Schmadel et al. | 356/352 |
| 4,400,056 | 8/1983 | Cielo | 350/96.30 X |
| 4,468,091 | 8/1984 | Schmadel et al. | 350/96.30 |
| 4,537,469 | 8/1985 | Kircher | 350/96.10 |
| 4,538,527 | 9/1985 | Kitchen | 350/96.10 |
| 4,568,408 | 2/1986 | Schmadel et al. | 156/626 |
| 4,581,527 | 4/1986 | Crane et al. | 250/227 |
| 4,586,030 | 4/1986 | Klostermann | 250/227 |
| 4,603,252 | 7/1986 | Malek et al. | 250/227 |
| 4,609,816 | 9/1986 | Severin | 250/227 |
| 4,626,652 | 12/1986 | Bjork et al. | 350/96.33 |
| 4,629,318 | 12/1986 | Malek et al. | 356/237 |
| 4,695,344 | 9/1987 | Crane et al. | 156/242 |
| 4,733,068 | 3/1988 | Thiele et al. | 250/227 |
| 4,772,092 | 9/1988 | Hofer et al. | 250/227 X |
| 4,812,645 | 3/1989 | Griffiths | 250/227 |
| 4,827,121 | 5/1989 | Vidrine Jr. et al. | 250/227 |

FOREIGN PATENT DOCUMENTS

| | | | |
|---|---|---|---|
| 2937824 | 10/1980 | Fed. Rep. of Germany | 350/96.29 X |
| 7805317 | 9/1979 | France | 250/227 X |
| 53119068 | 10/1978 | Japan | 350/96.29 X |
| 2036336 | 6/1980 | United Kingdom | 350/96.29 X |

OTHER PUBLICATIONS

Fibre Optic Damage Detection in Composite Structures by Hofer-Published Sep. 1987 Issue of Composites.

Primary Examiner—William L. Sikes
Assistant Examiner—Brian M. Healy
Attorney, Agent, or Firm—Rogers, Bereskin & Parr

[57] ABSTRACT

A damage detection and evaluation system utilizes optical fibers to detect and assess damage to a structure. The optical fibers are intermittently etched in a controlled manner to weaken them so they fracture when a desired load is applied to the structure. Where visual inspection of the optical fibers is used to check for damage, a reference set of optical fibers is used. Where photodetection is used and minimal connections to the structure are required, one end of the optical fiber is made reflecting so an optical connection is only made to the other end. To further simplify the connection, a single input/output optical connection to a demultiplexing/multiplexing chip mounted on or within the structure is provided. Where orthogonal grids of fibers are not possible, the invention provides interdigitated optical fibers and volume backscattering to locate the position of the first fracture along the length of the optical fiber. The entire periphery of a damaged area can then be determined with a set of such interdigitated optical fibers. Again, a single optical interface to the structure can be provided using a demultiplexing/multiplexing chip. In the case of composite materials, the optical fibers are located between specified plys and at a specified orientation for optimum sensitivity.

60 Claims, 14 Drawing Sheets

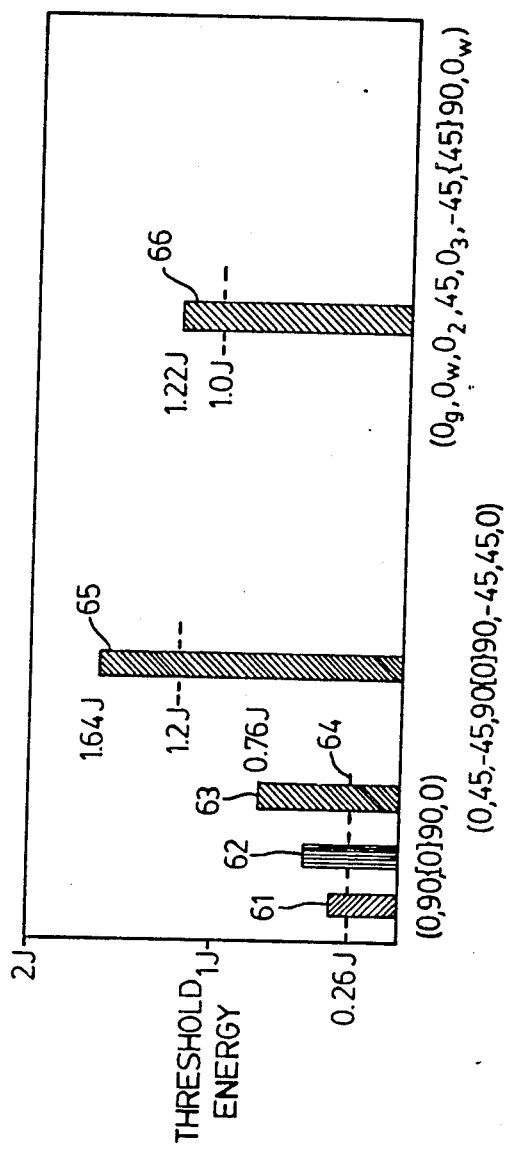

DAMAGE EVALUATION SYSTEM AND METHOD USING OPTICAL FIBERS

FIELD OF THE INVENTION

This invention relates to a damage evaluation system, and more particularly to a damage evaluation system utilizing optical fibers, which enables the integrity of a component to be monitored in real time, without requiring a structure to be dismantled or the component to be sectioned or otherwise damaged.

BACKGROUND OF THE INVENTION

At the present time, there is increasing interest and use of composite materials. Typically, such composite materials comprise various layers or plys of a fiber, e.g. glass fiber, carbon fiber, Kevlar (trade mark) or some other fiber, bonded together by a resin or polymer. The fibers provide the strength to the material, and with fibers being developed, composite materials can be extremely strong and light weight, i.e. with a good strength-to-weight ratio. Further, composite materials can have a tailored stiffness, can readily be molded into complex shapes, and have good thermal expansion properties and resistance to fatigue and corrosion.

For these various reasons, composite materials are gaining wide acceptance in many industries, notably the aircraft industry. It will be appreciated that, in an aircraft, the integrity of structural components is vital. At the same time, because of weight considerations, one does not want to build in any excessive redundancy into the aircraft structure. Accordingly, it is necessary to monitor components formed from reinforced composite materials.

Unfortunately, this is made difficult by the fact that composite materials have some unique failure modes. Their very nature endows them with anisotropic properties, and in particular, the polymer or resin matrix is at least and order of magnitude weaker than the embedded fibers of glass, carbon or Kevlar. As a consequence, failure of the matrix can occur, without any damage to individual fibers. Cracking parallel to material fibers within a given ply and disbonding between successive plys can occur, such cracking being known as "delamination". Unfortunately, a relatively low energy impact, e.g. a dropped tool, or a high energy impact with a bird in flight, can cause an area of delamination. Once started, the region of damage or delamination can grow with continued stress cycling.

A further problem with such damage is that it is often not evident from external visual inspection. It will be appreciated that, of necessity, where a component is in service nondestructive techniques must be used. Present nondestructive diagnostic techniques include X-rays; ultrasonic scanning systems; holography; vibrothermography; acoustic emission analysis; and structural monitoring using optical fibers. At least for X-ray examination and ultrasound C-scan examination, a considerable amount of time and experience has been invested in developing these techniques. However, they have a number of limitations. Further, there are numerous situations, where they cannot be used. Thus, for an aircraft leading edge which has a rubber or resilient de-icing boot, an ultrasound examination technique cannot be used, unless this is removed. Many other techniques, apart from those using embedded optical fibers, require dismantling of the structure. Consequently, they are time consuming and expensive, and often require a skilled technician to perform the test.

Monitoring techniques have been proposed, using a network of optical fibers embedded into the structure of a component and forming an integral part of it, and such techniques potentially have a number of advantages. Theoretically, through the use of optical fiber sensing technology can be used for a number of purposes: e.g. impact detection and location; delamination and microcrack detection and location; strain and deformation mapping. Structurally embedded optical fibers have the advantage of being light weight and small. They require no electromagnetic shielding, provide no conductive path and possess a high bandwidth which can avoid the use of multiple cables. They are insensitive to electromagnetic interference, are inert and are safe. Further, the optical fibers could be used to monitor a component from initial manufacture to the end of its useful life. Thus, there can be used to provide information on the state of a structural component throughout manufacture, installation, maintenance and use. During manufacture, they could be used to provide information on the degree of cure, and hence are for the possibility of better quality control. Carefully positioned optical fibers can be used to provide a warning of incorrect installation, e.g. by being fitted around rivet holes. During use or maintenance, the optical fiber sensing can monitor any damage inflicted to the structure.

It is known to embed optical fibers into a composite material, for detecting damage. One proposal can be found in U.S. Pat. No. 4,581,527 (Crane et al). This discloses a damage assessment system using a three-dimensional grid of optical fibers. The fibers are located in a number of layers. Like many earlier proposals, this patent suggests that it is necessary to use an orthogonal grid of optical fibers to determine a damaged area. Further, it apparently suggest that, even for a panel, it is necessary to provide a grid of optical fibers at different depths in order to detect damage. There is no discussion as to how the composite material fails, or the relationship between the strength and failure of the optical fibers, and the failure of the composite material.

U.S. Pat. Nos. 4,603,252 and 4,629,318 to Malek and Hofer, and also an article by Bernd Hofer in the September 1987 issue of Composites, vol. 18, pages 309–316, describe other fiber optic damage detection systems. U.S. Pat. No. 4,603,252 describes the technique in which optical fibers are again laid in an orthogonal grid pattern. The patent suggests that individual optical fibers are used to replace some of the carbon reinforcing fibers. It is not clear how this would be achieved, since in practice, the reinforcing fibers are usually provided as a "prepreg" comprising a mesh of fibers impregnated with a resin. As the optical fibers replace the reinforcing fibers, they necessarily are collinear with the reinforcing fibers and this is clearly shown. The patent also mentions the possibility of providing surface roughness on the fibers, to increase their adhesion to the surrounding synthetic material. No precise indication is given as to size of the microscopic notches relative to the size of the optical fiber. Further, it is suggested that this roughness could be provided by etching; since etching conventionally smooths a surface, it is not clear how this would be achieved. Again, there is no discussion as to how a composite material fails, nor any discussion as to how the optical fibers should be laid relative to the reinforcing fibers, to achieve the most reliable performance. The second Malek and Hofer U.S. Pat. No.

4,629,318 provides a measuring device for determining cracks in a test object, which provides an arrangement in which a number of optical fibers can be scanned sequentially, to determine which fibers have failed. A number of different orientations of fibers, e.g. around rivet holes, is suggested. The patent also teaches a technique in which the optical fibers are mounted on an adhesive foil, for mounting on the surface of a structure. However, there is no teaching of a specific method of incorporating the optical fibers into a composite material. The basic technique relies upon scanning light across interruptions in the optical fibers, with the interruptions being aligned with one another. One then checks for the emission of light at either end of each fiber. If there is no light emission, then this is indicative of a rupture in the optical fiber, and hence of a failure in the object to which it is bonded.

The article by Hofer in the September 1987 of Composites describes a system of optical fibers integrated into a composite structure, and includes examples of applications of this technique to aircraft and other components. Whilst some of the described techniques use optical fibers extending in just one direction, there is no teaching as to how such uni-directional fibers can be used to define the entire boundary of a damaged area. Here, Hofer only teaches that the absence of light transmission through a fiber indicates a damaged area along its length. Again, mention is made of a chemical treatment for the surface of the fibers, with the intention of influencing the strength of the fibers. Whilst this article recognizes that impacts on composite panels cause damage at the rear side of the panel, there is no appreciation of the details of the delamination mechanism.

Finally, U.S. Pat. No. 4,772,092, again to Hofer and Malek, describes a crack detection arrangement using optical fibers as reinforcement fibers. Here, light conducting fibers are substituted for regular reinforcing fibers in a multiple lamina, with the optical fibers being woven in with the reinforcing fibers. No details are given as to how such an arrangement would be employed in use.

SUMMARY OF THE PRESENT INVENTION

Accordingly, the present invention is directed to meeting a number of desirable objects for a damage detection and evaluation arrangement, in which optical fibers are embedded in the material of a component, or bonded to the surface of a component, so as to be integral therewith. In this specification, for brevity, such a system or arrangement is referred to as a Damage Evaluation using Structurally Integrated Fiber Optic Reticulate (DESIFOR) system, particularly for composite material structures.

Now, the energy to damage a particular composite depends on a variety of factors, e.g. the number and arrangement of the plys used, a manner in which a panel is supported, and the type of reinforcing material used. Accordingly, if a damage detection system is to be in any way universally applicable, it is desirable to adjust the failure strength of the optical fibers, so that they fail reliably at a known load, relative to the load applied to the composite material as a whole. The optical fibres can then be tailored to individual applications. This problem is nowhere directly addressed in the prior art.

A further consideration is to embed optical fibers in a composite structure, so that they are sensitive to the formation of cracks or delamination, and hence will accurately predict the onset of any damage to a composite structure. Again, this feature is nowhere adequately addressed in the prior art, which generally starts from the assumption that, if optical fibers are present, they will be damaged when the composite structure is damaged.

Further, it is desirable that the optical fibers should be capable of being simply, easily and reliably embedded into a composite structure, without any special assembly techniques, or without any major alteration in the conventional assembly procedure for a composite structure.

Preferably, any such DESIFOR system should enable the entire periphery of a damaged area to be determined by using optical fibers either in the form of a grid or extending in just one direction, i.e. without forming an intersecting grid, and should further preferably include an arrangement that simplifies the interface with an interrogation or monitoring unit.

In accordance with the first aspect of the present invention, there is provided a method of treating optical fibers to alter the fracture strength of the optical fibers, for use in a DESIFOR system, the method comprising:

(a) applying a protective coating to a plurality of first, selected parts of an optical fiber;

(b) subjecting the optical fiber to an etchant, to etch a plurality of second parts of the optical fiber which are not protected, to produce second parts of reduced external diameter whilst leaving the first parts with the diameter of the optical fiber prior to etching, the etching being carried out so as to form transitional parts between the first and second parts, which are such as to provide substantial stress concentrations and sufficiently weakened to reduce the fracture strength of the optical fiber.

In this specification including the claims, the term "fracture strength of an optical fiber", is a measure of the load on or impact energy on a fiber reinforced composite material including such treated optical fibers necessary to cause fracture of the optical fibers. Thus, an increase in the fracture strength of the optical fiber is related to an increased impact energy to cause fracture, and correspondingly a decreased fracture strength is related to a decreased fracture strength to cause fracture of the optical fiber.

By this technique, the optical fibers can be treated, so that they will fail under desired loads and conditions. By forming the optical fiber with intermittent parts of reduced diameter, it is believed that the optical fiber is more securely locked in the matrix of the material. Consequently, any tensile strain in the material is properly transferred to the optical fibers. The steps or transition areas between the first and second parts of different diameters serves to increase the stress in the fibers, and hence has a weakening effect. By selectively varying the amount by which the second parts are reduced in diameter, one can thus alter the degree of weakness given to the fibers, relative to the original, untreated fibers.

The etchant can comprise a liquid etchant, such as aqueous $NH_4HF_2$ or Hydrofluoric acid (HF). Alternatively, it is envisaged that flash heating or lasers could be used to weaken the fibers.

Usually, the fibers are provided with a plastic protective jacket, and this would be removed before the etching is carried out.

In accordance with this first aspect of the invention, there is also provided an optical fiber, which has a core of uniform diameter and a cladding comprising first and second parts alternating with one another, wherein the first parts have a first diameter, and the second parts have a second diameter which is less than the first diameter.

In accordance with a second aspect of the present invention, there is provided a fiber reinforced composite material, which comprises:

a plurality of layers of reinforcing fibers, with the fibers of each of two adjacent layers extending in one direction within that layer;

a plurality of optical fibers extending generally parallel to one another and spaced apart from one another between said two layers, with the optical fibers extending at the largest possible angle relative to the reinforcing fibers of each of said two layers, and with the angle between the optical fibers and the fibers of one of said two layers being substantially equal to the angle between the optical fibers and the fibers of the other of said two layers.

In a preferred embodiment of this second aspect of the invention, the fibers in the two layers are parallel to one another. In this instance, the optical fibers would then extend perpendicularly to the reinforcing fibers in the two layers.

It has been established by extensive experimental testing, that orientating the optical fibers perpendicular to adjacent layers of reinforcing fibers, which are otherwise parallel to one another, gives the best and most accurate sensitivity to the onset of cracking and delamination. As detailed below, if the optical fibers are parallel to the reinforcing fibers, then in many instances cracks will not be detected. This is because cracks at least initially extend through the weakest component of the reinforced composite material, namely the polymer. Thus, the cracks extend parallel to the reinforcing fibers where possible without damaging them or breaking optical fibers extending parallel to them.

As is known, failure of the optical fibers can be detected by checking the transmission of light throughout the length of each fiber, i.e. seeing if light entering one end of the fiber emerges at the other end. There are three basic ways in which this can be carried out. First ends of the fibers can be grouped together and arranged for illumination by a flashlight or special light source. Then, an inspector need only visually inspect the other ends of the fibers, to check for light emitting from them, as an indication that the fibers are intact and that there is no damage; damaged fibers are detected by no light transmission at their other ends. For ease and certainty of inspection, the present invention optionally provides reference fibers, which do not extend through a zone subject to damage. The reference fibers would have first ends bunched with the first ends of the damage detecting fibers, so as to similarly receive light from the light source. Their other ends would be provided in a row adjacent the other ends of the damage detecting fibers. An inspector would then look for a row of points of light from the damage detecting fibers, corresponding to the row of lights from the other ends of the reference fibers. It should then be more readily apparent if any detection fiber has failed, since there will be an illuminated reference fiber, with no corresponding illuminated detection fiber.

The foregoing arrangement has the advantage of simplicity in construction and inspection. As an alternative, illuminating light for the optical fibers can be provided by a fiber optic bundle connected to first ends of the detection optical fibers, which again are bunched together. The other ends of the optical fibers would then be connected either to a further optical fiber, which would maintain the spatial coherency, and which would connect the detection fibers to an interrogation unit. Alternatively, the other ends of the optical fibers are connected to a photodetector array, which in turn is connected to the interrogation unit. The advantage of this arrangement is that the detection optical fibers can be relatively remote from the interrogation unit or other sensing equipment. Further, such an arrangement enables damage detection and evaluation to be carried out in real time.

Where one is simply relying on the transmission, or failure to transmit, of each optical fiber, then no indication is given as to where the failure is in each optical fiber. Accordingly, in order to obtain the location and shape of a damaged zone, as opposed to the mere presence of a damaged area, it will be necessary to use a grid of intersecting optical fibers. In this case, in accordance with the present invention, one group of optical fibers would be sandwiched between a pair of adjacent plys of reinforcing material, and another group of optical fibers, intersecting the first group, would be sandwiched between a separate pair of plys of reinforcing material. Preferably, the two groups of optical fibers are located on either side of one ply of reinforcing material.

It is also to be noted that, it is not always necessary to illuminate one end of each fiber, and then inspect the other end for emission of light. As an alternative, the other can be mirrored. Then, illumination and inspection would both occur at the first end of the fiber, and this may have advantages in many circumstances.

There may be special circumstances, where it is either difficult, or impossible, to use orthoganol grids of fibers. In these circumstances, the present invention provides, as another aspect, a technique for determining the location of the fracture in each optical fiber, which in turn enables the periphery of a damaged zone to be determined. This is detailed below.

A third aspect of the present invention is concerned with the method in which the optical fibers are embedded or placed into a composite material. This aspect of the invention provides a method comprising:

(a) providing a support surface for the optical fibers;

(b) providing a plurality of pins extending from the support surface, defining a desired pattern for the optical fibers;

(c) locating a plurality of optical fibers around said pins in the desired pattern;

(d) placing a layer of pre-impregnated reinforcing fibers onto the support surface, whereby the optical fibers adhere to said layer;

(e) removing said layer with the optical fibers adhered thereto, and placing said layer into a mold for a component.

The pins on the support surface can either be permanently mounted, in which case they will extend through the layer of impregnated material when it is placed on the support surface, but will not prevent the removal of the layer. Alternatively, the pins can be retractable, e.g. with each pin being a frictional fit within a small bore. In which case, as the layer of impregnated reinforcing fibers is placed on the support surface, the pins are pushed back into their bores until they are flush with the support surface.

The layer of reinforcing fibers can be in a form known as "prepreg", i.e. a layer of reinforcing fibers coated with a resin (some "prepregs", so-called "wetlayups", do not contain resin, and this is applied later). The resin serves to keep the reinforcing fibers together as a single unit, and is sufficiently tacky to bond the optical fibers thereto, until the layer is placed within a mold.

In accordance with a fourth aspect of the present invention, there is provided a structurally embedded fiber optic damage detection and evaluation system comprising:

a plurality of optical fibers mounted to a component, for detecting damage within a predetermined area of the component, the optical fibers comprising a first group of spaced apart fibers extending across one edge of said area to another, generally opposite edge of said area, and a second group of fibers extending across said other edge to said one edge with the first and second groups of optical fibers being interdigitated with one another, whereby, if there is a damaged zone within said area, the edge of the damaged zone adjacent said one edge is determined by the first group of optical fibers, and the edge of the damaged zone adjacent said other edge is determined by the second group of optical fibers.

It will be appreciated that the optical fibers can be mounted to the component by embedding the optical fibres of the component, whether that be a composite material, e.g. a Kevlar/resin composite, or a uniform material, e.g. plastic. Alternatively, the optical fibers can be bonded to the surface of a component, irrespective of its composition.

Where the fibers are mounted on the surface of a component, it is preferable, and generally necessary, that they do not intersect one another. In which case, an interdigitated structure such as that outlined above can be used. Alternatively, where the precise shape and location of a damaged area is not required, back reflection fibers, i.e. fibers mirrored at their ends, could be used. Such fibers can be configured to provide a general indication of the damaged area. Thus, for a row of rivets, one could have one fiber associated with each rivet.

For each optical fiber, preferably there is provided a light source, a directional coupler coupling the light source to the optical fiber, a reference photodetector and a signal photodetector. The two photodetectors are connected to the coupler, whereby the reference photodetector senses the light from the light source, whilst the signal photodetector detects the light travelling back from the optical fiber.

This arrangement has the advantage that it is not necessary to provide an orthogonal grid of fibers. This can be of considerable advantage. The optical fibers generally have a diameter considerably greater than the diameter of the reinforcing fibers, and this can present difficulties for certain reinforcing fibers. In particular, if a grid of intersecting optical fibers is required, then difficulties can occur at the intersections. For this arrangement, there is no need for any optical fiber to intersect with another one. The first and second groups of fibers are interdigitated with one another. Then, one group of fibers determines the boundary or edge of a damaged zone on one side, whilst the other group of fibers determines its boundary or edge on the other side thereof.

As a further development of this aspect of the present invention, a single light source, capable of emitting light of one of a plurality of different wave lengths (e.g. a wavelength scanned laser), is provided and connected to the fibers of the first and second groups. The light source is connected via a demultiplexing/multiplexing device, capable of sequentially illuminating each of the optical fibers of each of the first and second groups. Again, a coupler and reference and damage detecting photodetectors are provided. The demultiplexing/multiplexing device is such that light is sequentially fed to each optical fiber of each of the first and second groups, depending on the wavelength. When the light returns down any of these optical fibers this device then serves as a multiplexer and send the light back down the input optical fiber. Thus, this arrangement has the advantage that only a single connection is required to the composite material component, which is necessary in certain configurations. Also, this arrangement is applicable to an array of optical fibers mirrored at their ends for back reflection.

BRIEF DESCRIPTION OF THE DRAWINGS

For a better understanding of the present invention and to show more clearly how it may be carried into effect, reference will now be made, by way of example, to the accompanying drawings in which:

FIG. 11 shows the variation of fracture threshold energy for different layups in composite panels and varying optical fiber treatment;

DESCRIPTION OF THE PREFERRED EMBODIMENTS

Figure 1:
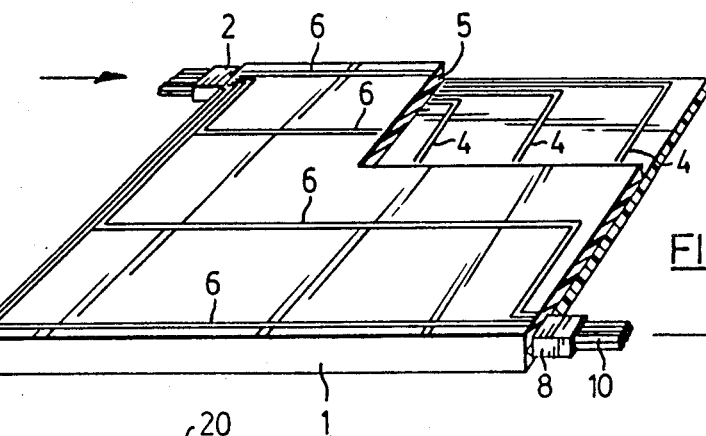
FIG. 1 is a perspective schematic view, partially cutaway, of a composite material including a damage detection system employing optical fibers according to the present invention.

Referring first to FIG. 1, there is shown a composite panel 1. An input bundle of optical fibers 2 is provided at one corner of the panel 1. The fibers are then divided into a first group of fibers 4 extending generally parallel to one another in one direction across the panel 1, and a second group of fibers 6 extending parallel to one another and perpendicular to the first group of fibers 4. The two layers of optical fibers 4, 6 are separated by a ply 5 of reinforcing material. All the optical fibers then come together and can be interrogated at an output connector 8, which is connected to an output optical fiber bundle 10. The optical fibers can be interrogated by one of the three methods described below and shown in FIG. 2.

The input bundle 2 is connected to a light source, and the output connector 8 would either be connected directly to a photodetector array (not shown) or through the output bundle 10 or an optical fiber ribbon to a photo detection system, with spatial coherency being maintained.

If the panel 1 is damaged in the areas covered by the optical fibers 4, 6, then the optical fibers are fractured locally. This interrupts the light transmitted down the damaged optical fibers, even after the load is removed.

Figure 2A:
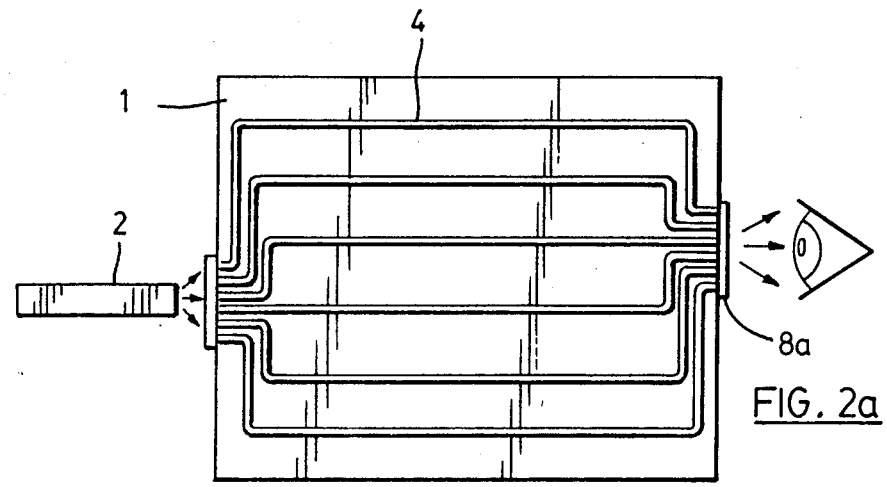
FIGS. 2a-2c are schematic views showing alternative illumination and interrogation techniques.
Figure 2B:
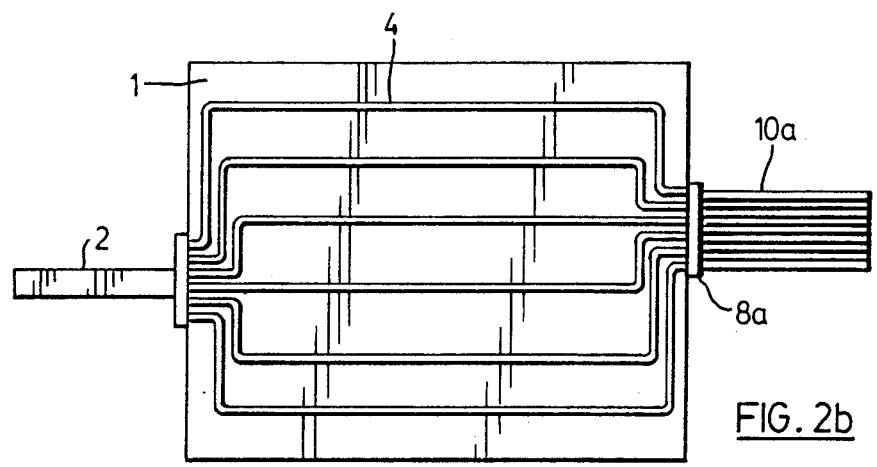
Figure 2C:
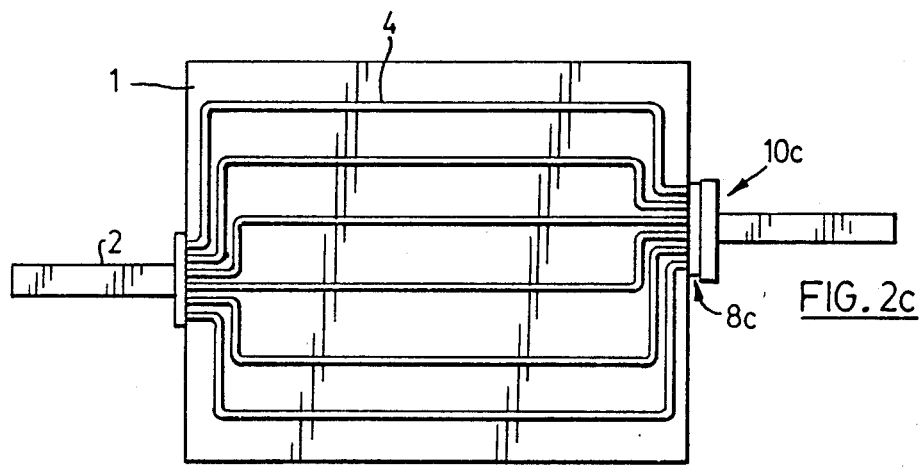

FIG. 2, schematically displays three approaches. FIG. 2a illustrates the visual inspection approach where light from a mobile source is directed into an input port and damage is determined by observing which optical fibers have suffered a major loss of light. This could be facilitated by including in the output port 8a a reference set of optical fibers (not shown) that would be designed and configured not to fracture. FIG. 2b schematically illustrates a system that would involve an input bundle of optical fibers 2 and an output ribbon of optical fibers 10a that would be interfaced to an output connector 8a in such a manner as to maintain spatial coherency. FIG. 2c illustrates the case where the damage sensing optical fibers 4 are interrogated directly by a photodetector array 10c that is interfaced to the output connector 8c.

Figure 3:
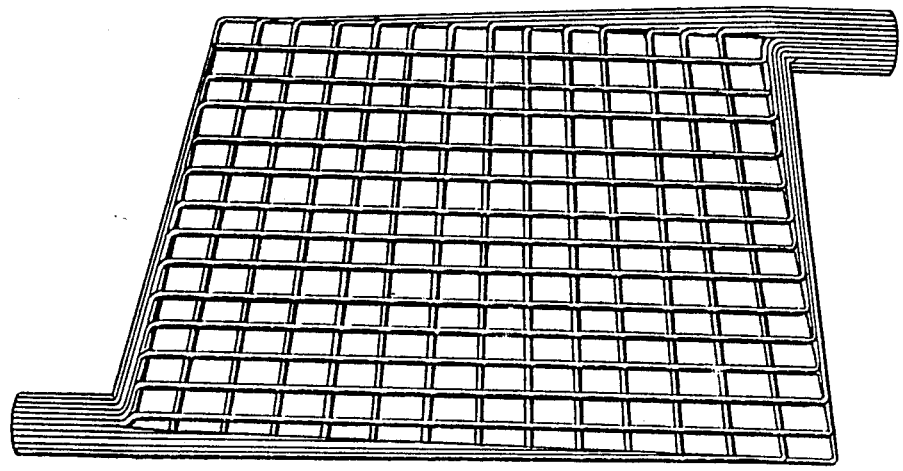
FIGS. 3 and 4 are perspective views showing the behavior of the composite material sample of FIG. 1.
Figure 4:
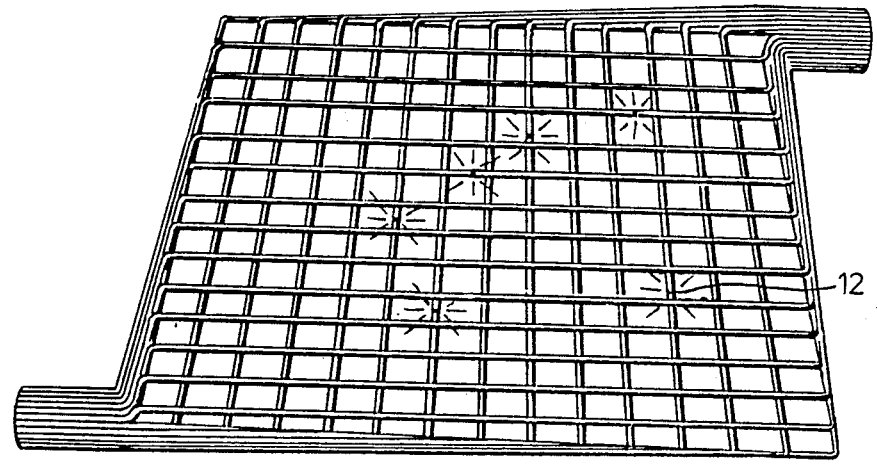
Figure 6:
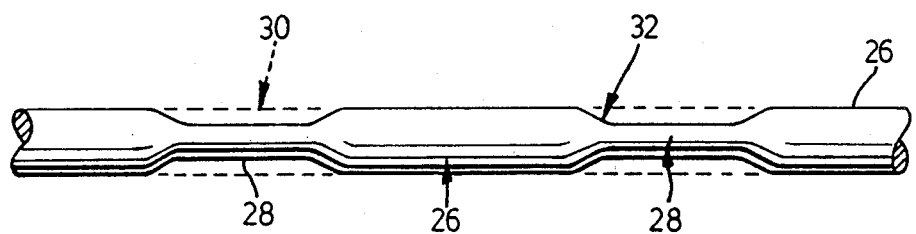
FIG. 6 is an enlarged schematic view of part of an optical fiber after treatment.

FIG. 3 reveals the translucent nature of Kevlar/epoxy composite panel 1 by displaying the diffuse light emitted by the optical fibers especially near bends. As shown in FIG. 4, if the reinforced panel 1 is subject to an impact roughly centrally thereof, then a number of the optical fibers are fractured. As indicated at 12, this results in light bleeding out from the damaged ends of the optical fibers 4, 6, giving an indication of the location and extent of damage, which may not be apparent from visual inspection of the surface of the panel 1. It should be noted that the light bleeding from the fractured ends of the optical fibers is much more intense than the diffuse light that indicates the placement of the optical fibers. A double exposure was used to reveal the diffuse light.

FIGS. 1-4 show the general principle behind the present invention, and such an arrangement with an orthogonal array of optical fibers is shown in some of the earlier patents.

Now, one of the problems identified by the applicants is that the optical fibers are generally of a larger size and stronger than the reinforcing fibers. Thus, Kevlar fibers may have a diameter of 5-10 microns, with the optical fiber having a diameter of 125 microns. The minimum diameter of the optical fiber is limited by the fact that it is necessary to have a reasonable amount of light transmitted through the fiber; if a fiber is too small, there is simply insufficient light transmission for an accurate measurement to be made. Whilst optical fibers as small as 50 microns in diameter are available, there are difficulties in handling them and polishing (terminating) their ends.

The large optical fibers give two problems. Firstly, if they are laid one upon another, as indicated in other patents, e.g. Crane et al, then problems arise at the intersections. First there is a major perturbation or disruption of the plys of the reinforcing fibers, adversely affecting the strength of the material. Further, the optical fibers themselves can suffer stress and microbending effects, where they cross one another. The stress can cause unintentional fractures of the optical fiber. A second problem is that the optical fibers are stronger than the matrix material of the composite and consequently cannot be used to detect low levels of damage. This latter problem is related to the general strength of the optical fibers. The applicants have found that uniform etching of the optical fibers prior to embedding them within a composite panel does not make them more sensitive to damage even though the etching has reduced their overall diameter. Here, we are concerned with the strength relative to the strain imposed on the fiber; clearly, reducing a fiber diameter will reduce the actual strength of that fiber as a whole, i.e. the maximum load that it can withstand, but the strength per unit cross-section is largely unaffected. What is important is that when an impact or other load is applied to the composite material, resulting in a certain deformation or strain, then when this is sufficient to damage the composite material, it should simultaneously fracture or break the damage sensing optical fibers embedded within it.

By way of comparison, the ultimate tensile strength of bare glass fibers has been measured to be 2 GPa, whereas a Kevlar/epoxy matrix fails at around 15 MPa. Further, optical fibers are more resistant to cracking than a matrix of Kevlar and epoxy. Accordingly, the applicants have realized it is necessary to modify the optical fibers, to cause failure at a desired strain. A sequence of treatments for the optical fibers by etching is shown in FIGS. 5a-5e, and FIGS. 6, 7a and 7b show the results of this treatment.

Figure 5A:
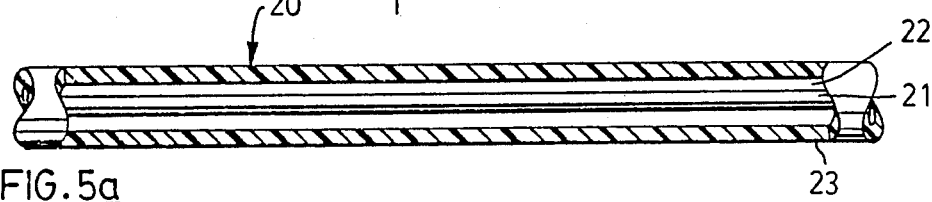
FIGS. 5a-5e are schematic views of an optical fiber showing steps in a method of treatment according to the present invention.

Referring to FIG. 5a, there is shown an optical fiber 20, which can be a conventional, commercially obtainable optical fiber. In the case of the examples described below, the fibers were Corning 1517 multimode with a cladding diameter of 125 microns and a core of 50 microns. Such an optical fiber 20 comprises a core 21, a cladding 22 and an outer plastic, protective jacket 23.

Figure 5B:
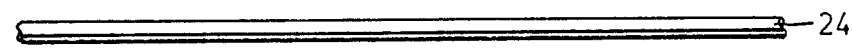

A first step is to remove the plastic protective jacket 23, which can be done with an suitable solvent. This leaves the core and cladding 21, 22, as shown in FIG. 5b; for simplicity, in FIGS. 5b-5e, the core 21 and 22 cladding are not shown separately. The bare fibre, comprising just the core and cladding, without the protective jacket 23, is designated by the reference 24.

Figure 5C:
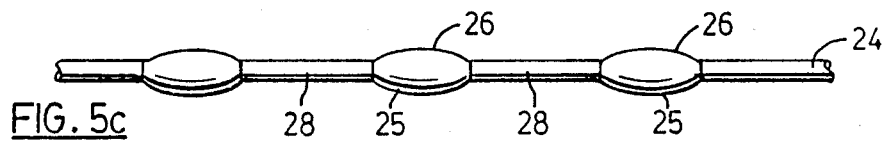

As shown in FIG. 5c, a protective coating 25 is applied intermittently along the stripped optical fiber 24.

This gives first parts 26 of the optical fiber coated with the protective coating. Correspondingly, alternating with the first parts 26 are second parts 28 of the optical fiber 24, which are left unprotected. The spacing of the protected first parts 26 could be up to 5 mm, for example. It will also be realized that parts of the optical fiber which are not actually required for damage detection, but are present simply to connect the damage sensing length of the treated optical fiber to the exterior need not be etched. Thus, one could have relatively long length of unetched optical fiber running to and from the input/output connectors at the edge of the structure to the damage sensing sections of the embedded optical fibers.

Figure 5D:
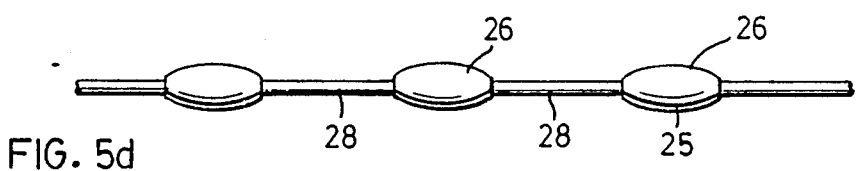

The optical fiber 24 is then subject to an etchant, namely saturated aqueous $NH_4HF_2$ or Hydrofluoric acid. This causes exposed glass to be dissolved, reducing the diameter of the second parts 28, as shown in FIG. 5d.

Figure 5E:
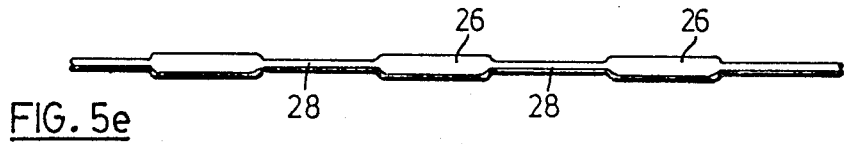

A solvent is then used to remove the protective coating 25 from the first parts 26, to leave the first and second parts alternating with one another, as shown in FIG. 5e. As shown in greater detail in FIG. 6, the first parts 26 maintain the original diameter of the stripped optical fiber 24, this being indicated at 30. The second parts 28 have been etched to a reduced diameter, thereby forming transition or tapered parts 32 between the first and second parts 26, 28.

Figure 7A:
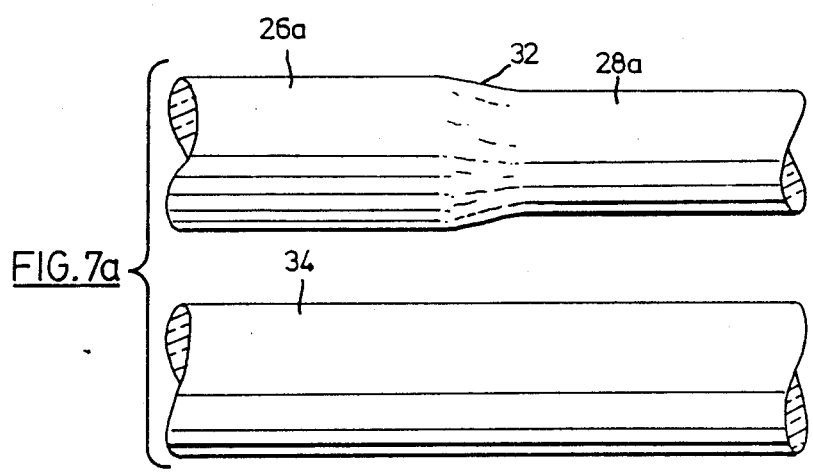
FIGS. 7a and 7b show examples of optical fibers treated in accordance with the method of the present invention.
Figure 7B:
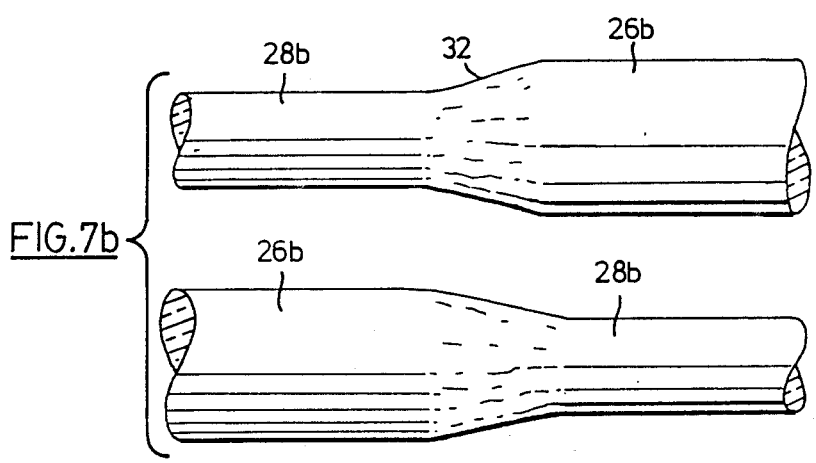

FIGS. 7a and 7b show this effect in greater detail on actual fibers.

In FIG. 7a, an original unetched, bare fiber, with its protective jacket removed, is indicated at 34. A scale is shown at the bottom left have corner of FIGS. 7a, 7b, and the fiber 34 has an initial outer diameter of 125 microns. The fiber after etching is shown at the top of FIG. 7a, and as can be seen there is a first part, here denoted 26a, and a second part 28a of reduced diameter. In this case, etching was carried out for a relatively short time.

FIG. 7b shows a further example of the results of the etching treatment. Here, etching was carried out for a greater length of time, and left first parts denoted 26b and second parts 28b of reduced diameter, the second parts 28b being of greater reduced diameter than the second parts 28a of FIG. 7a. FIG. 7b more clearly shows the transitional tapered parts 32 between the first and second parts 26b, 28b. It should also be noted that one result of the etching treatment is, as may be expected, to smooth the outer surface of the fibers. Thus, as FIG. 7b shows, second parts 28b have a smooth surface. However, the transitional tapered parts 32 may have a relatively uneven surface. In the context, this is desirable, since it increases the possiblity of stress concentrations, and also weakens the optical fiber.

Figure 8:
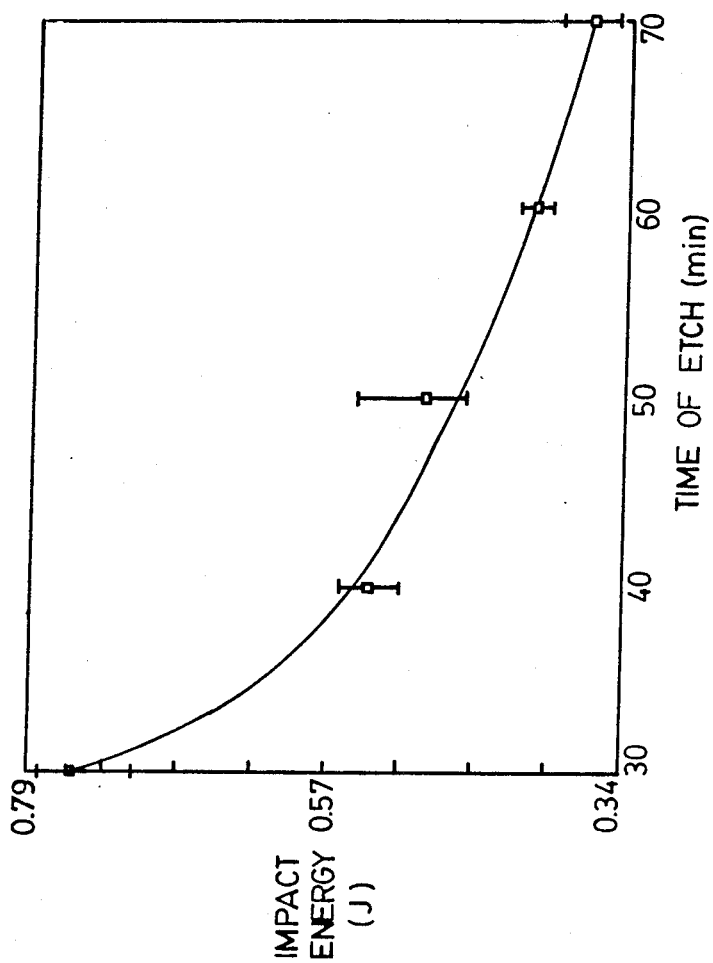
FIG. 8 shows a graph of the variation of threshold impact energy required to fracture the treated optical fiber against etching time.

FIG. 8 shows a graph of the variation of the impact energy required to fracture embedded optical fibers against etching time. This is for optical fibers in orientation 55 of a four layer cross-ply Kevlar coupon or panel, shown in FIG. 9 and described in detail below. As FIG. 8 shows, for a half hour etch time, the impact energy to cause failure of the optical fibers was close to 0.75 J. Increasing the etch time leads to a substantial reduction in this fracture threshold impact energy, and hence this clearly shows that the optical fibers are weakened by this etching technique. For a 70 minute etch time the impact energy necessary to cause fracture is reduced to 0.38 J.

The significance of this is that it clearly shows the optical fibers can be treated to have different fracture threshold energies for different composite materials. Further, it is even possible to tailor the failure characteristics of the optical fibers, to give a desired safety factor. Thus, from laboratory testing, one may determine that for a particular component of composite material, an impact energy of one Joule is necessary to fracture the embedded optical fiber. However, as a precautionary measure, one may treat the optical fibers to fail when an impact of 0.4 Joule is received, thereby ensuring that damage to the component should never go undetected.

It is believed that the intermittent etching of the optical fibers has three principal effects. It permits the formation of transition or tapered parts 32 between the parts 26, 28 of different diameters. This in turn ensures that the different parts of the optical fiber are mechanically locked into the composite structure, and thus must necessarily be subject to the loading applied to the composite material. Further, the transitional tapered parts 32 are believed to provide stress concentrations, which effectively magnify the local strain field to which the optical fibers are subjected and lastly they reduce the effective strength of the fibers due to the formation of microcracks. It has been found possible to reduce the strength of the original fiber by a factor of ten. As a consequence, one can ensure that the optical fibers fail over a wide range of applied loads.

Whilst the optical fibers are described as being etched by a suitable liquid etchant, other techniques are possible, and it is envisaged that lasers or localized flash heating could be used to intermittently modify the properties of the optical fibers. The use of a liquid etchant has the advantage that it permits accurate control of the damage sensitivity and is reproducible. It is simply a matter of immersing the optical fibers 24 with the intermittent coating 25 for the desired length of time. The length of immersion controls the degree of etching. A plot (not shown) of fiber diameter against etch time for an initial 125 micron fiber shows that the diameter is linearly decreased to slightly less than 85 microns after 90 minutes of immersion in saturated $NH_4HF_2$.

Figure 9:
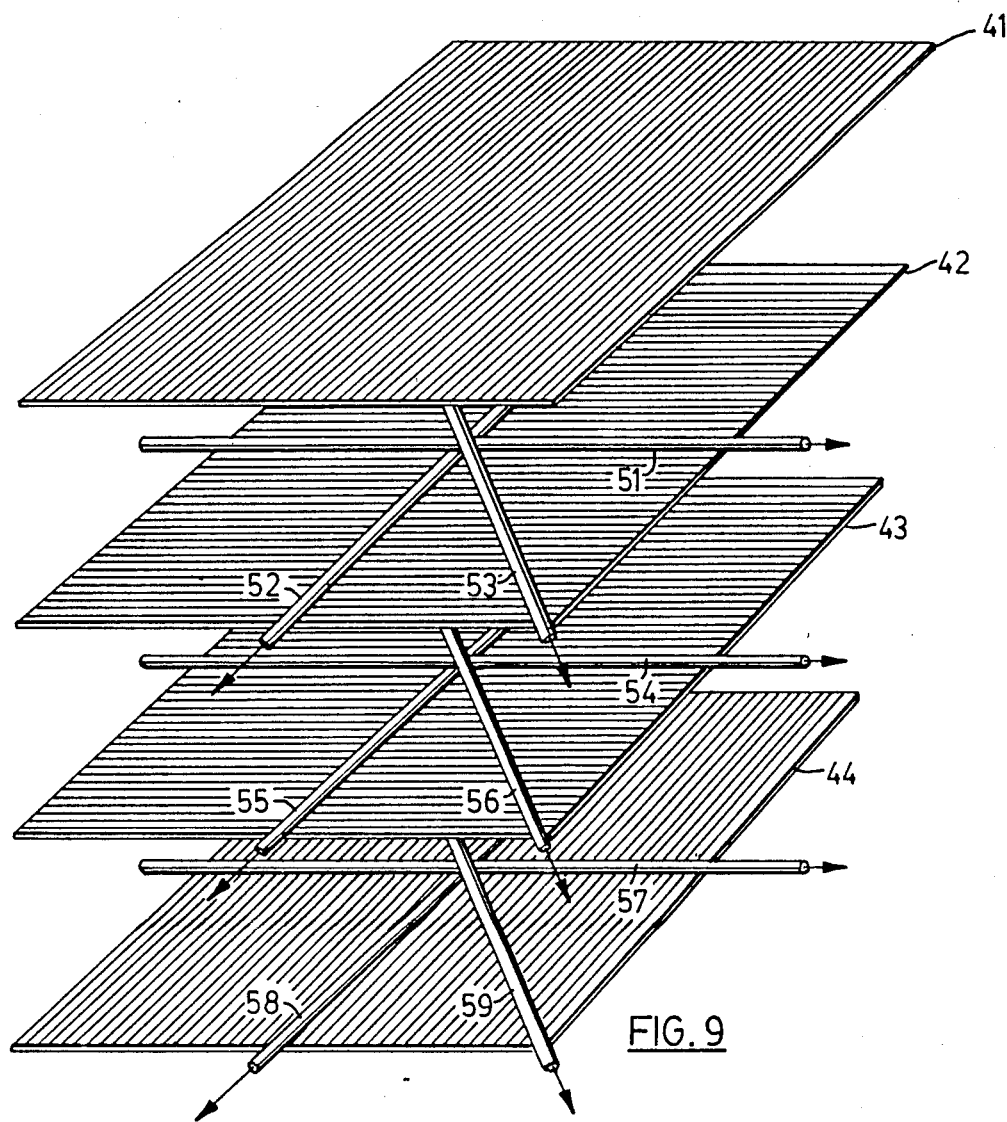
FIG. 9 shows a perspective, exploded view of a composite fiber panel and possible orientations of optical fibers.

Reference will now be made to FIG. 9 and subsequent figures. In these figures, conventional notation is used to denote the orientation of the different fibers. Square brackets are used to indicate the upper and lower surfaces of a composite panel. The impact surface corresponds to the leftmost ply. The orientation of the reinforcing material fibers in the different layers or plys is indicated in degrees, i.e. 0 degrees, 45 degrees, 90 degrees etc. The subscripts 2, 3 etc. indicate that there are two or three such layers, subscript W indicates that the ply is woven layer, and the subscript G indicates that this is a layer of reinforcing fiberglass. Where a panel is symmetrical about a central plane, then the layup on one side is given within the square brackets, and the subscript s used to indicate that this is a symmetrical panel and that the other half of the panel corresponds to that given in the square brackets. Applicants use what is believed to be a new notation to indicate the presence of the optical fibers. Again their orientation is given in degrees, and the relevant angle is given within the curly brackets, while their location indicated by the position of curly brackets. It will also be realized that a negative sign is used to reduce the size of the angles given; e.g. −45 degrees is equivalent to 135 degrees.

Referring now to FIG. 9, there is shown a four ply Kevlar panel with the layup [0, 90, 90, 0], which equally could be represented as [0, 90]$_S$. The panel as a whole is denoted by the reference 40. It has upper and lower plys 41, 44 of Kevlar oriented in the 0 degree direction, and two middle plys 42, 43 of Kevlar oriented in the 90 degree direction.

References 51-59 indicate nine possible orientations of damage sensing optical fibers. Whilst orientations 51, 53 are symmetrical with respect to orientations 57, 59, they are not symmetrical with the upper panel ply 41. In these tests, the upper ply 41 was the impact surface, and as detailed below, depth from the impact surface has considerable influence on the damage sustained.

A series of tests were carried out with Kevlar/epoxy panels formed in accordance with FIG. 9, utilizing each of the optical fiber configurations 51, 59. As the panels were translucent, actual damage was detected by a backlighting technique with enhanced image processing (as described in a paper by Glossop et al.

This was found to provide superior resolution, as compared with a conventional ultrasound C-scan. Moreover, it is more convenient in many respects. A large number of tests were carried out, and determinations made as to whether the optical fibers correctly detected damage. If an optical fiber fractured within the region of damage, i.e. cracking and delamination, then the optical fiber was considered to have given a correct indication of damage; correspondingly, if the optical fiber broke outside the damaged or delaminated area, or failed to break at all, it was considered to have given an incorrect indication. The following results were obtained for the nine configurations:

| Optical Fibre Configuration | Correct Prediction Probability % |
| --- | --- |
| 51 | 29(I) |
| 52 | 75(I) |
| 53 | 75(S) |
| 54 | 75(I) |
| 55 | 100— |
| 56 | 64(S) |
| 57 | 67(I) |
| 58 | 60(I) |
| 59 | 97(S) |

The Correct Prediction Probability is defined as the number of correctly predicted fractured and unfractured optical fibers over the total number of fibers and is given as a percent, with an indication as to whether the fibers were super sensitive (S) or insensitive (I). Thus, for configuration 51, the Correct Prediction Probability was only 29 percent. The (I) sign indicates that where the prediction was in error it was because the fibers failed to break and indicate damage, i.e. they were insensitive. Correspondingly, a (S) sign indicates that the fibers were overly sensitive, and where an incorrect damage prediction was given, this was because they failed beyond the zone of damage determined by image enhanced backlighting.

As can be seen, the only orientation that gave a 100 percent accurate prediction was the orientation 55, i.e. with the optical fibers aligned perpendicularly to the two adjacent plys 42, 43. Orientation 54 with the optical fibers parallel to the adjacent plys 42, 43 only gave an accuracy of 75 percent whilst orientation 56 gave an even lower accuracy of 64 percent.

For the upper and lower groups of optical fibers, it can be noted that fibers 51, 52, 57 and 58, each of which is both parallel to one adjacent ply and perpendicular to the other adjacent ply, were insensitive. On the other hand, orientations 53, 59, at 45 degrees to the two adjacent plys, were too sensitive.

The observation that orientation 55 gives the most accurate results was reinforced by further experiments involving four ply [45, −45]$_S$ Kevlar/epoxy panels, where it was found that [45, −45, {45}, −45, 45] was the optimum configuration. It was also determined from a number of different 8 and 16 Kevlar/epoxy panels that for optimum sensitivity the optical fibers should be located as close to the rear surface, i.e. opposite the impact surface, as possible. This is because damage occurs most readily at the rear surface for such thin panels.

For thicker panels (or thin panels that are reinforced with honeycomb), this is not necessarily the case. Here, due to reduced flexure and high contact stresses, damage may occur closer to the impact surface, and the optical fiber should then be embedded close to the impact surface for optimum sensitivity. It is to be appreciated that relative thinness or thickness depends not only on the number of plies but also on the size of the panel. Thus, sixteen plies is thick for a small panel, but thin for a large panel.

Where woven materials are present, if a woven layer is adjacent a unidirectional ply, then the optical fibers should be placed perpendicular to the unidirectional fibers. If no unidirectional plys are present, then the optical fibers should be placed between the woven plys, perpendicular to the direction of the higher density of material fibers. Since woven materials tend to have a higher damage tolerance, the spacing of the optical fibers and their degree of treatment will need to be adjusted, to give the desired damage sensitivity and resolution.

With regard to the mechanism that causes the optical fibers to break, the three most likely mechanisms are: flexurally induced tension, delamination induced shear forces, and through the thickness cracks. A theoretical analysis utilizing a computer program to compute the strain fields, suggests that optical fibers parallel to the material fibers should experience the highest strain, and hence be most prone to failure (as described in further detail in a paper by R. M. Measures et al in S.P.I.E. 1988 vol. 986, paper 12). As discussed above in relation to FIG. 9, this is clearly not the case, and this cannot be the principal fracture mechanism.

An impact to a thin laminate causes matrix cracks to appear on the rear surface, when the strain exceeds the ultimate strength of the matrix. These cracks propagate upwards through collinear plys until they reach an interface with plys in a different direction. The cracks are then deflected and cause disbonding or delamination between the adjacent plys. Analysis of several thin, i.e. less than 16 plys, Kevlar panels has verified this theory. Accordingly, it is believed that the optical fibers fracture when a matrix crack propagating through the thickness of adjacent collinear plys encounters an optical fiber.

Figure 10A:
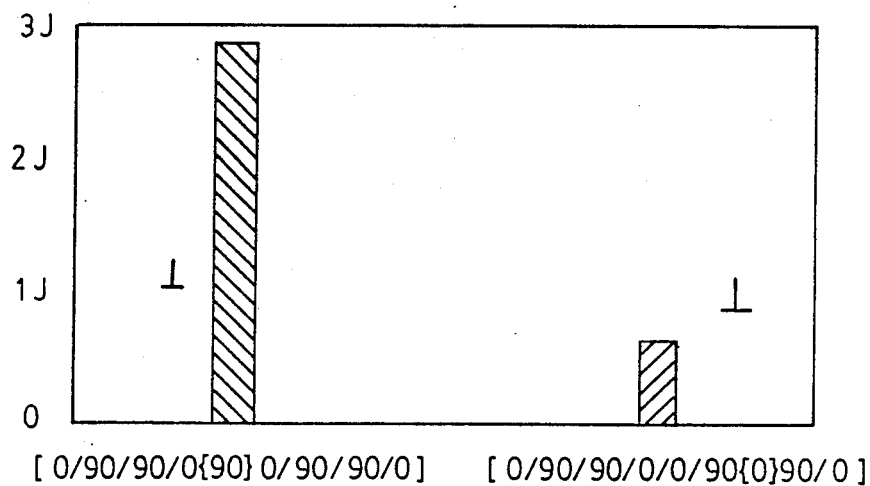
FIG. 10a shows the difference of fracture threshold energy with depth of the optical fibers in a composite panel.
Figure 10B:
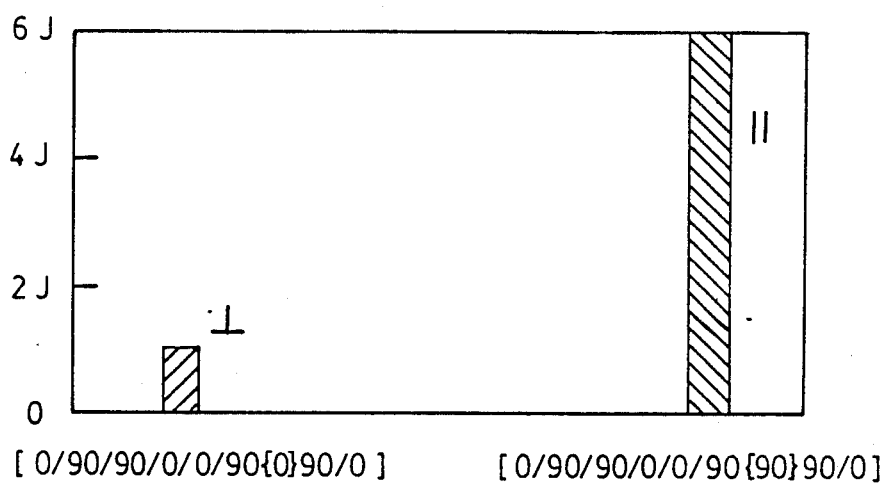
FIG. 10b shows the difference of fracture threshold energy with orientation of the optical fibers in a composite panel.

This analysis is supported by the experimental results in FIGS. 10a and 10b. These figures show the impact energy necessary to cause fracture of the optical fibers, for different placements and orientations of the optical fibers. FIG. 10a shows that for an eight ply panel, optical fibers located between the second and third plys from the rear are more sensitive than optical fibers placed in the middle of the panel. In both cases, the optical fibers were perpendicular to the two adjacent plys. The fibers located in the middle required nearly three times the impact energy to fracture them, as compared to the fibers between the second and third plys from the rear face. FIG. 10b clearly shows the difference between laying the optical fibers perpendicular to the adjacent plys and collinear (or parallel) with them. In the two examples of FIG. 10b, the optical fibers are between the second and third plys from the rear face of an eight ply panel. The left hand side of FIG. 10b corresponds to the right hand side of FIG. 10a, and shows that a relatively low impact energy is required to fracture the fibers perpendicular to the reinforcing fibers of the adjacent plys. On the other hand, when the optical fibers are laid parallel to the adjacent reinforcing fibers, a much higher energy is required to fracture them, in this case greater than the six Joules available. The most plausible explanation is that the optical fibers are fractured by matrix cracks propagating up through the panel from the rear surface.

Turning to FIG. 11, this shows the threshold impact energy necessary to fracture optical fibers embedded in several different composite material layups. At the left hand side of FIG. 11, there are shown three different results 61, 62 and 63, for four ply Kevlar panels as in FIG. 9, with the optical fibers at the orientation 55 shown in FIG. 9. The three test results correspond to optical fibers with different sensitivities, i.e. the optical fibers for test 61 were subject to greater etching than those of test 63. The dotted line 64 indicates the energy necessary to initiate a small region of delamination (corresponding to almost no visual surface damage) in the composite panel. It can be seen that by progressively weakening the optical fibers, a close correspondence between these energies can be obtained. It is conceivable that by further etching of the optical fibers, one could obtain an indication at some level just below the level 64, although this is believed to be unlikely.

At 65, the results for an eight ply panel are shown. Here, the optical fibers fractured at 1.64 Joules whereas damage occurred at 1.2 Joules. Again, these figures are close, and it is clear that the optical fibers could be tailored to fracture at an impact energy commensurate with causing barely visible damage to the panel. Similarly, 66 shows the results for another layup, which in fact corresponds to a planar form used in an aircraft leading edge, although it would include a honeycomb backing and a rubber layer on the outside. Again, the energy of 1.22 Joules caused fracture of the optical fibers, and is close to the one Joule energy level that initiates damage in the composite panel. Further tests have been carried out, using higher impact energies up to 50 Joules. Initial tests have involved a panel similar to that for the test 66, but with a rubber coating. It has been found that the damage threshold has jumped to 13.3 Joules, whilst the optical fibers at 45 degrees had a comparable threshold impact energy for fracture of 13.6 Joules.

Further tests have been carried out to show that the presence of the optical fibers does not adversely affect the strength of the panels [Ref. Measures S.P.I.E. 986-12]. Also, it has been shown that the optical fibers can be used to detect growth of a damaged area, when a panel is increasingly flexed.

Figure 12:
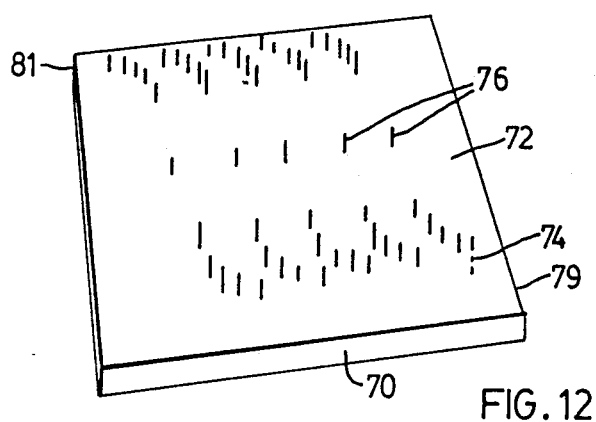
FIG. 12 is a perspective view of a device for aligning optical fibers to a desired configuration.
Figure 13:
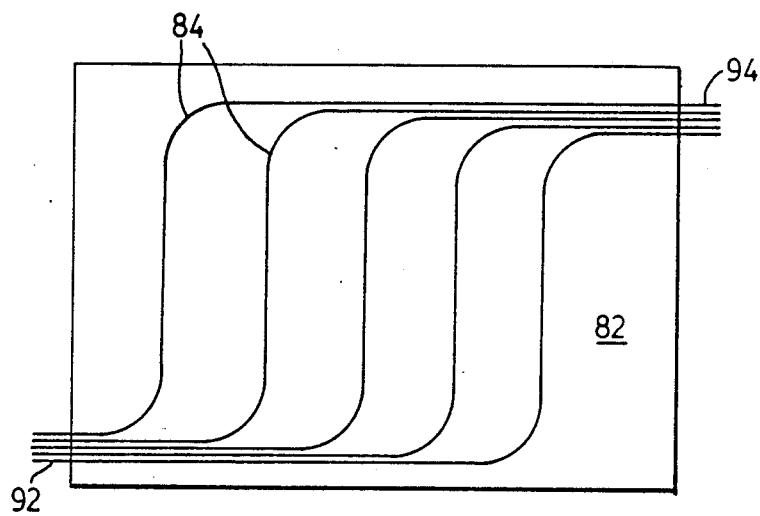
FIG. 13 is a plan view of a pre-impregnated layer of reinforcing fibers with optical fibers adhered thereto.

Reference will now be made to FIGS. 12 and 13, which show an apparatus according to the present invention, for carrying out a method for inserting the optical fibers into a composite fiber structure. FIG. 12 shows a board 70, which has an upper support surface 72. In the board 70, there are a plurality of bores or holes provided, as indicated by the dashed line 74 for one of these. A plurality of pins 76 are mounted in the bores, with the tops of the pins protruding above the support surface 72. The pins are arranged to define a series of paths for the damage sensing optical fibers 90. The pins 76 are such as to define first one bend and then the second bend for optical fibers. The layout of the optical fibers is shown inverted, in FIG. 13, and is described below.

The pins 76 are mounted in their bores 74, so as to be a sliding fit, but there is sufficient friction, to maintain the pins above the support surface 72.

In use, optical fibers are laid on the support surface 72 in the desired pattern, as detailed below in relation to FIG. 13. Then, a layer of pre-impregnated so-called "prepreg" reinforcing fiber is laid on the optical fibers. This prepreg comprises a layer of reinforcing fibers, coated with resin as to be tacky. If necessary, it is heated to make the resin tacky. It is pressed down on top of the optical fibers on the support surface 72. This has the effect of depressing the pins 76 down into their bores 74, so that all the pins 76 are flush with the surface 72. Simultaneously, the optical fibers on the support surface 72 are adhered to the prepreg layer 82. The layer 82 is then lifted off the support surface 72, and is shown inverted in FIG. 13.

On the support surface 72, there is indicated at 79, the portion of the edge where the input group of optical fibers, would, as a bundle cross the edge of the support surface. Similarly, the output group of optical fibers 80 meet to form a bundle, which crosses the edge of the support surface 72 at 81.

FIG. 13 shows the inverted prepreg layer 82, with the optical fibers 84. It will be seen that the optical fibers 84 includes an input bundle 92, and an output bundle 94.

The portions of the optical fibers 84 which are to detect damage can be treated by the etching process detailed above. The portions forming the lead in/lead out bundles 92, 94 need not be treated. The resin of the prepreg layer 82 serves to securely hold the optical fibers 84 in place. The layer 82 can then be manipulated and placed into a mold containing other layers of reinforcing fiber, so that the optical fibers are sandwiched into the composite structure. If necessary, other layers can then be applied on top, before a final curing operation's carried out.

The use of this apparatus and method should thus ensure that the optical fibers 86, 90 are securely and accurately placed in the final component. The method involves minimal alteration in the conventional procedure for building up the layers in a multi-layer component. It is simply a matter of placing an appropriate ply or layer of the prepreg onto the support surface 72 to pick up the optical fibers in the pre-set pattern.

Whilst pins 76 are shown for a particular pattern, it will be realized that one could manufacture a universal board 70 including large number of pins and corresponding bores on a predetermined grid pattern. Then, for any particular optical fiber layout, it is simply a matter of pulling out the appropriate pins from the board so that they form the desired pattern, with the remaining pins being left flush with the support surface 72. Alternatively, one can make individual boards 70, for each particular fiber layout.

A further possibility is that the pins 76 could be fixed in position. Then, when the layer 82 is placed onto the support surface 72, the pins 76 simply pierce through the layer 82, which should have a minimal effect. Once the optical fibers have adhered to the layer 82, then it is lifted off the pins 76, together with the optical fibers.

To prevent the prepreg layer 82 adhering to the support surface 72, this support surface can be coated with a non-stick finish, eg. Teflon, or covered with a Teflon cloth. Further, instead of placing the prepreg layer 82 onto the board 70, the process could be reversed. The board or jig 70, with the optical fibers located on it, could be lifted up and then placed onto a prepreg sheet 82.

Having now described how optical fibers may be modified to have desired characteristics to fracture at appropriate impact loads etc., and how the optical fibers can be embedded into a composite material with the optimum orientation and location, description will now be given of how the optical fibers may be used to detect and asses damage.

As indicated earlier in FIG. 2, there are several simple transmission arrangements possible. There are, however, certain circumstances that warrent new approaches. If it is desirable, or necessary to use only one (armoured) optical fiber to interface with a structure, then an approach based on demultiplexing and muliplexing will be necessary. This concept can be understood by first considering the interrogation arrangement for each damage sensing optical fiber. A preferred method involves using damage sensing optical fibers with mirrored ends and a possible arrangement is schematically displayed as FIG. 14a.

Figure 14A:
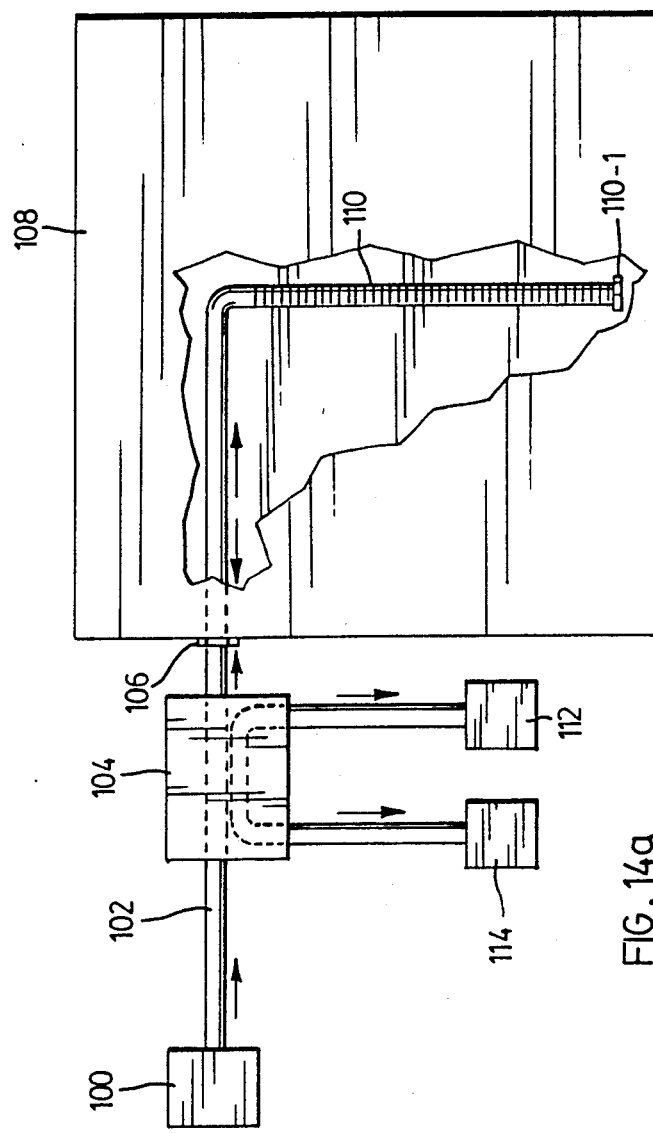
FIG. 14a is a schematic plan view showing an optical fiber with mirrored end, light source and coupling arrangement.

In FIG. 14a, a light source 100 is connected to an optical fiber 102, which in turn passes through a directional coupler 104. The output of the directional coupler 104 is connected to an input/output connector 106 at the edge of a reinforced panel 108. An optical fiber 110 is embedded in the panel 108, and the damage-sensing part of the optical fiber 110 is marked, to indicate that it has been subjected to the intermittent etching treatment described above.

The directional coupler 104 also has an output connected to a reference photodetector 112 and a signal photodetector 114. The 3dB directional coupler 104 is such that about 50% of the light entering it from the light source 100 is directed to the reference photodetector 112, for producing a reference signal. Light reflected by the mirrored end of the damage sensing optical fiber 101-1 passes back through the input/output connector 106 and again about 50% of this light is directed to the signal measuring photodetector 114 by means of the coupler 104.

The outputs of the two photodetectors 112, 114 are compared, to determine if there is any damage to the optical fiber 110. The amount of light returned from the optical fiber 110 is substantially reduced if the optical fiber 110 is fractured by damage to the panel in which it is embedded. The signal from the photodetector 112 permits the measurement of the light returned from damage sensing optical fiber 110 to be independent of fluctuations in the power from the light source 100.

Figure 14B:
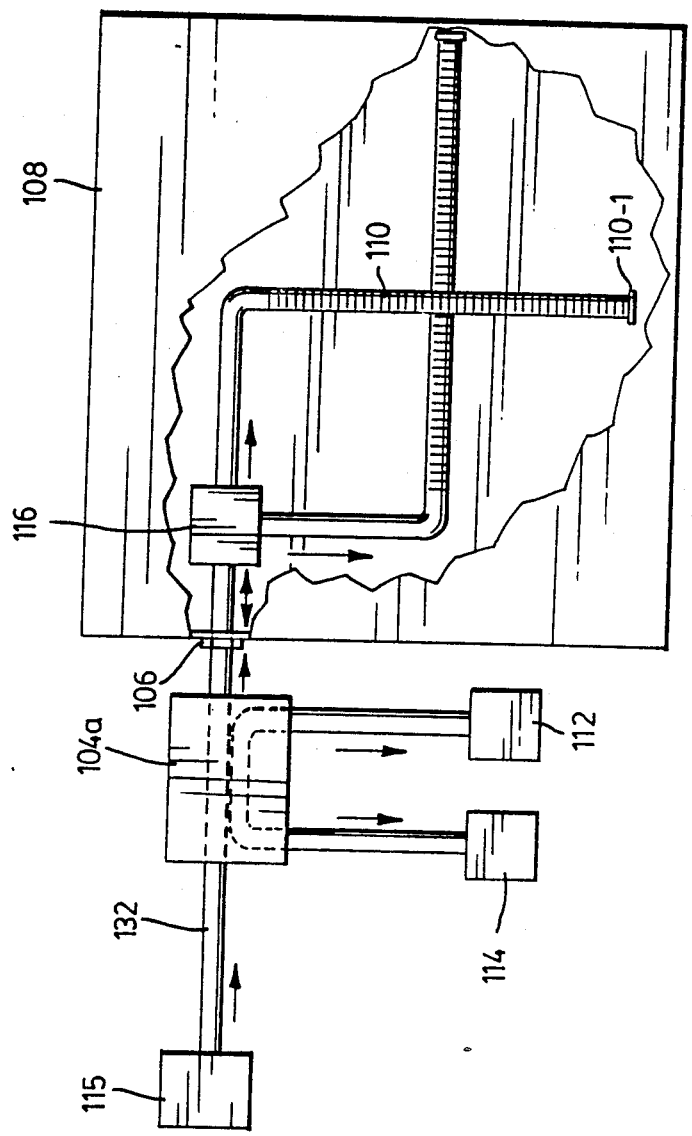
FIG. 14b is a schematic view similar to FIG. 14a, including a pair of optical fibers and a demultiplexing-/multiplexing arrangement.

As stated, this approach would be used in conjunction with a demultiplexing/multiplexing device whereby a number of damage sensing optical fibers could be interrogated sequentially. FIG. 14b schematically illustrates a likely arrangement. Light from a variable wavelength source 115 is directed through the coupler 104 into the wavelength division demultiplexing/multiplexing chip WDDMC 116 by means of the input/output connector 106. (In this specification, WDDMD is also used to refer to a wavelength division demultiplexing/multiplexing device, and DMD refers to a demultiplexing and multiplexing device which may use a technique other than wavelength division). Two representative damage sensing optical fibers are seen, one between one pair of plys and the other which is perpendicular to the first lies between a second pair of plys. As the wavelength of the laser 115 is scanned, the light is sequentially directed by the WDDMC into each of the damage sensing optical fibers 110. The returning signal is then redirected independent of wavelength by the WDDMC back down the input optical fiber to the coupler 104, where about 50% is directed towards the signal photodetector 114.

For certain applications, it may not be possible to use an orthogonal grid of damage sensing optical fibers. This is the case when the optical fibers are bonded to the surface of a structure, such as a metal surface of an airplane. Under these circumstances the location and extent of damage could be ascertained by use of volume backscattering wherein the damage sensing length of the optical fiber is made to return a signficant amount of light per unit length. In this case the end of the optical fiber is made nonreflecting. A fracture of the optical fiber would then reduce the amount of light so backscattered. In this instance, the amount of light returned will generally be less than from the mirrored end system and so an asymmetric coupler is employed and the arrangement for a single damage sensing optical fiber shown in FIG. 15.

The light from source 100 is now directed through the asymmetric coupler 104a so that maybe 90% of the incident light is directed towards the input/output coupler 106 and only 10% is coupled to the reference photodetector 112, see insert 104(b). As shown in the asymmetric coupler two optical fibers of different core size are positioned closely together such that most of the light propogating from the smaller optical fiber is launched into the larger core optical fiber. The comparison between the signal and reference photodetectors is even more important in this instance as the level of light returned is likely to be small and so source variation need to be cancelled. It might also be mentioned that use of reference optical fibers could also permit allowances to be made for changes in the efficiency of the input/output connector.

Figure 15:
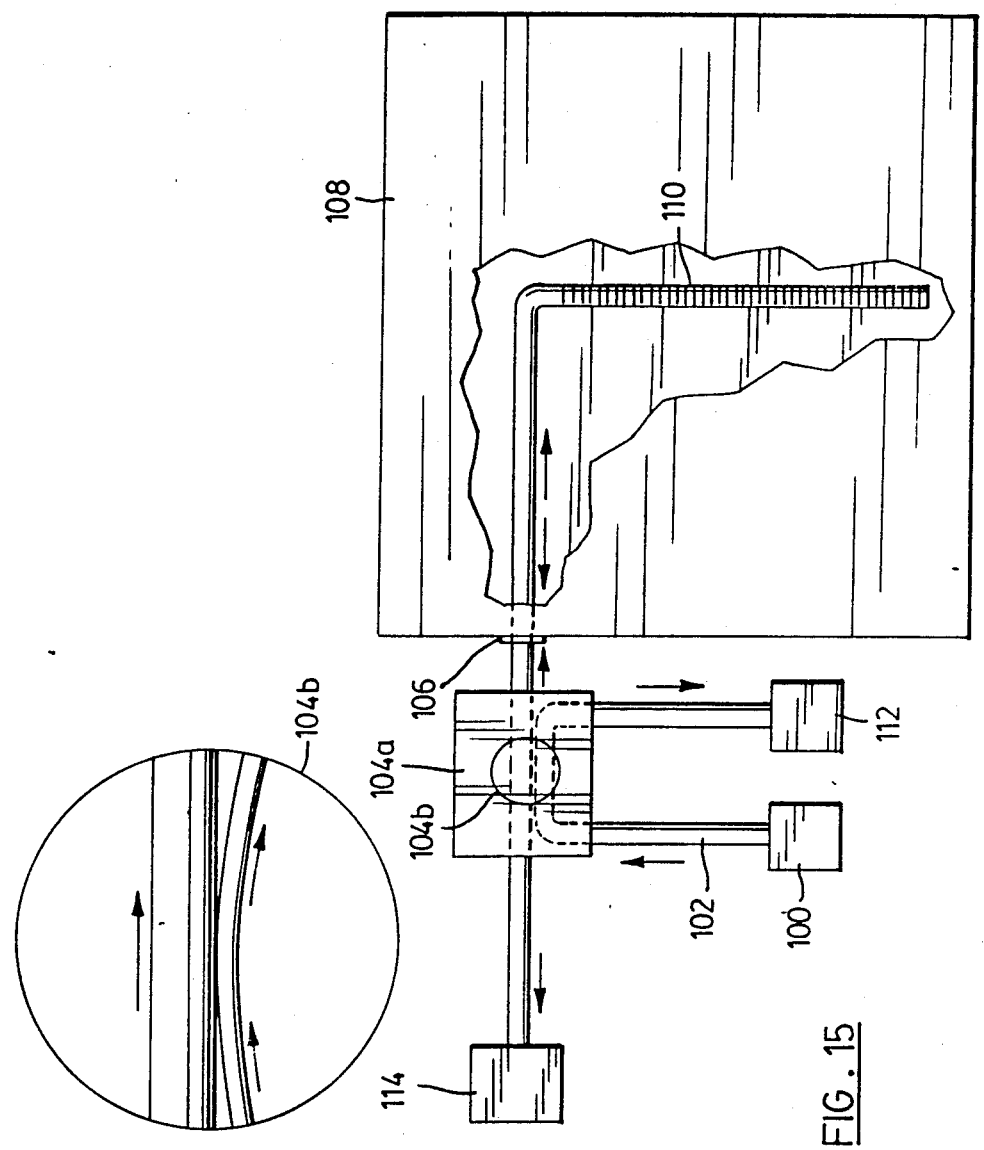
FIG. 15 is a plan schematic view, similar to FIG. 14a, including a backscattering optical fiber with an insert showing an asymetric coupler on an enlarged scale.
Figure 16:
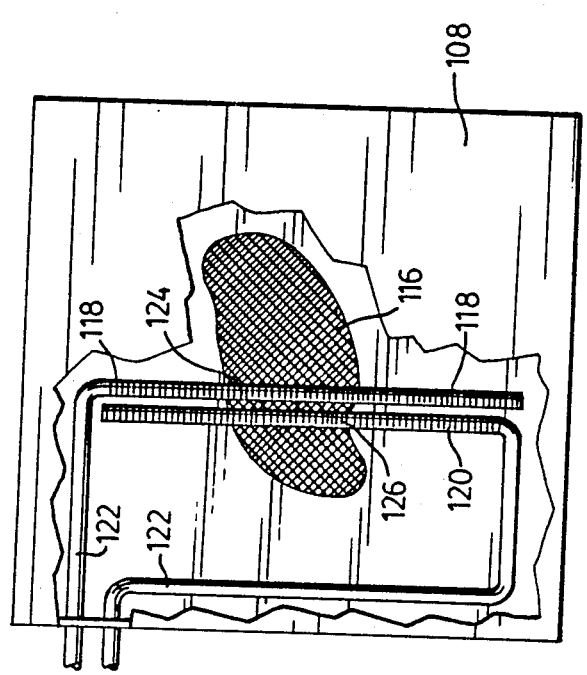
FIG. 16 is a schematic view including a pair of volume backscattering optical fibers and showing a damaged zone.

If the optical fiber 110 of FIG. 15 extends across a damaged area, then one point of the boundary of the damaged area should be detected FIG. 16 shows how a pair of opposed, parallel, optical fibers can be used to detect both sides of a damaged area. In FIG. 16, the panel is again indicated by the reference 108, and includes a damaged area 116. Here, one optical fiber 118 extends in one direction, and another optical fiber 120 extends in the opposite direction, with both optical fibers having ends 122 at the edge of the panel 108. The damaged area 116 will cause fractures in the optical fibers 118, 120. However, as viewed in FIG. 16, a fracture 124 in the optical fiber 118, adjacent an upper edge of the damaged zone 116 will separate the undamaged part of the fiber 118 from the remainder thereof. Thus, the fiber 118 will give an indication of the location of the upper edge of the damaged area 116. Similarly, a fracture 126 adjacent the lower edge damaged area 116 separates the undamaged part of the optical fiber 120 from the remainder thereof, and can be sensed. This therefore determines the lower boundary of the damaged area 116. Thus, the pair of fibers 118, 120 provide a pair of points on opposite sides of the damaged area 116. By providing a plurality of pairs of such optical fibers, extending in opposite directions, one can obtain the complete periphery of the damaged area 116.

Figure 17:
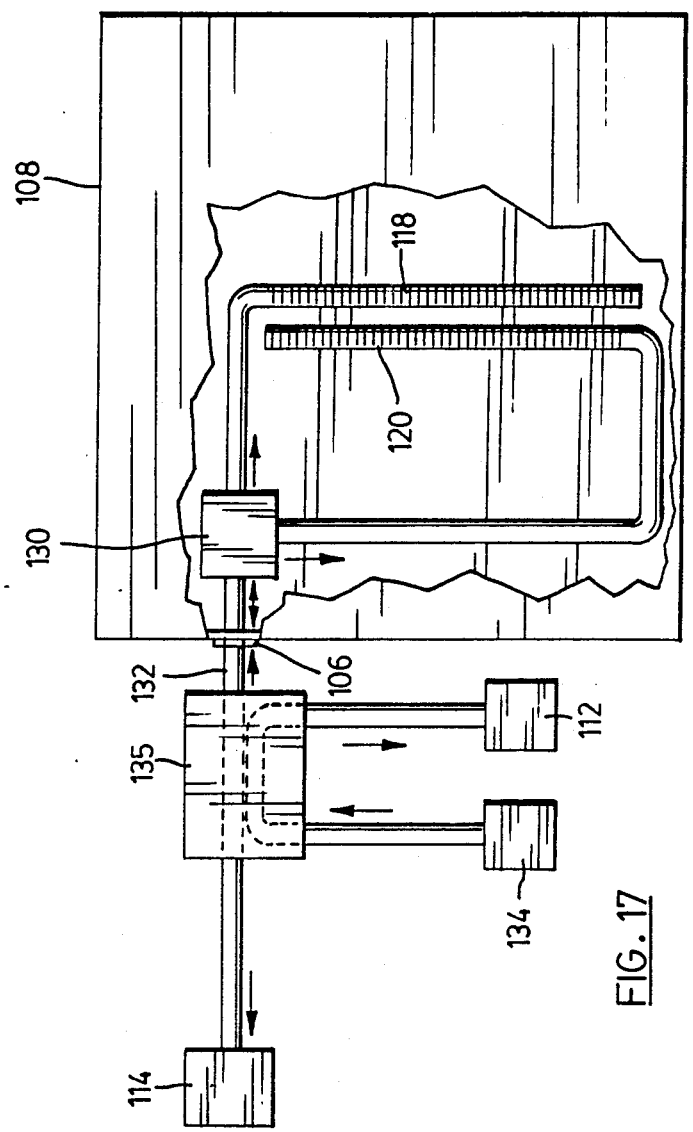
FIG. 17 is a schematic plan view similar to FIG. 15, showing the provision of demultiplexing/multiplexing and a pair of volume backscattering optical fibers.

For a structure with many damage sensing optical fibers, a WDDMC is again used and the arrangement shown in FIG. 17. Here the WDDMC 130 is connected to two representative damage sensing optical fibers 118, 120. As in FIG. 15, light from the source, in this case a wavelength scanned laser, 134 is directed through the asymmetric coupler 135.

In use, the laser is scanned through its wavelength operating range, and the WDDMC 130 sequentially illuminates each optical fiber 118, 120. Again, comparison of the signals detected by the photodetectors 112, 114 gives an indication as to the undamaged length of each optical fiber. Since for each pair of signals from the photodetector 112, 114, the wavelength from the laser 134 is known, one also knows to which optical fiber the signals relate Thus, the single connecting opt:cal f:ber 132 enables signals to be read from a number of damage sensing optical fibers 118, 120 embedded within or bonded to the panel 108. Whilst only a single pair of optical fibers 118, 120 is shown, the actual number will be determined by the capacities of the wavelength scan laser 134 and WDDMC 130.

It should also be appreciated that the optical fiber arrangements shown in FIGS. 14 through 17 should greatly facilitate the interface of optical fibers with a structure. Unlike other proposals, there is no need for both ends of each optical fiber to leave the structure and be connected to some circuitry. Here, it is only necessary that one end of each fiber be connected to the appropriate circuitry, delivering a light signal and sensing the return signal. Further, the arrangement shown in FIG. 17 avoids the necessity of providing an orthogonal grid of fibers, with the resultant complexity of having fibers intersect or cross one another The optical fibers can be etched, to provide the desired damage sensitivity to the structure to which they are bonded or embedded At the same time, untreated, connecting lengths of the optical fibers can be left, which retain their original strength and flexibility. When a wavelength division demultiplexing/multiplexing system is used, the connection to external circuitry and interrogation units etc. is greatly simplified, permitting only one armoured optical fiber to be interfaced to each structure so instumented.

It should also be realized that, whilst FIGS. 16 and 17 show two separate optical fibers 118, 120, it may be possible to replace these with a single loop of fiber, which one illuminates alternately from each end.

For composite materials, it is envisaged that the array of optical fibers would be embedded into the relevant component during manufacture. It can then be used to monitor the component throughout its life, including monitoring the initial curing process and subsequent fabrication and installation stages.

Expected applications of this DESIFOR system include aircraft, space structures, pressure vessels, submarines, pipelines, storage tanks etc.

Whilst various preferred aspects of the invention have been described, it will be realized that there are many variations possible within the scope of the invention. Thus, for the etching technique, it is possible to leave a portion of the fiber entirely unetched, and for this portion it is conceivable that the original protective jacket could be left in place. Additionally, it is conceivable that one portion of an optical fiber could have its second parts etched to one second diameter, and another portion have its second parts etched to another, different second diameter This will enable the two portions to have different damage sensitivities. This could be used where the optical fiber extends through a composite panel, where the layup and strength characteristics etc. of the composite panel vary between two different portions The optical fiber can then be adjusted to have the necessary damage sensitivity for each of the two portions.

When optical fibers are to be embedded within composite materials it is important to make their lateral dimensions as small as possible to avoid perturbing the structure. One method of doing this is to use smaller diameter optical fibers. If this reduction in the overall diameter is achieved by reducing the core region then less light is available. On the other hand, if the core diameter is kept large and the cladding thickness reduced then the optical fiber becomes more lossy and light leaks out along its length. The latter effect can be reduced somewhat by using an intermediate cladding with a depressed refractive index. Since the optical fiber only needs to be thin in the direction perpendicular to the plys of the reinforcing fibers an alternative approach would be to use elliptically shaped optical fibers.

Whilst the above discussion has focused on the use of optical fibers to detect delamination, the DESIFOR system could be used to detect debonding. Thus, for example, in an aircraft structure, where a composite panel is bonded to a metal stringer, then a DESIFOR system can be provided to monitor the bond between them

We claim:

1. A method of treating optical fibers to alter the fracture strength of the optical fibers, for use in a DESIFOR system, the method comprising:
   (a) applying a protective coating to a plurality of first, selected parts of an optical fiber;
   (b) subjecting the optical fiber to an etchant, to etch a plurality of second parts of the optical rfiber which are not protected, to produce second parts of reduced external diameter whilst leaving the first parts with the diameter of the optical fiber prior to etching, the etching being carried out so as to form transitional parts, between the first and second parts, which are such as to provide substantial stress concentrations and sufficiently weaken the optical fiber to, reduce the fracture strength of the optical fiber 2. A method as claimed in claim 1, wherein at least one portion of the optical fiber, having a length substantially greater than the length of each of the first and second parts, is coated with the protective coating, so as to be left unetched.

3. A method as claimed in claim 1, wherein the optical fiber initially includes an original protective jacket, and wherein the protective jacket is removed, before step (a).

4. A method as claimed in claim 2, wherein the optical fiber initially includes an original protective jacket, which, with the exception of the portion of the protective jacket covering said one portion of the optical fiber, is removed before carrying out step (a).

5. A method as claimed in claim 1,. 3 or 4, wherein the etchant comprises a liquid acid.

6. A method as claimed in claim 5, wherein the optical fiber is immersed in the liquid acid for a predetermined time to give a predetermined reduction in the diameter of the second parts, to give a desired damage sensitivity.

7. A method b as claimed in claim 1, wherein the etching is effected by one of a laser and flash heating.

8. A method as claimed in claim 7, wherein the optical fiber initially has a protective jacket, which is removed before effecting the etching or weakening to the second parts thereof.

9. A fiber reinforced composite material, which comprises:
a plurality of layers of reinforcing fibers, with the reinforcing each two adjacent layers extending in one direction within that layer, and a polymer binding the reinforcing fibers together;
a plurality of damage sensing optical fibers extending generally parallel to one another and spaced apart from one another between said two layers of reinforcing fibers with the optical fibers extending at the largest possible angle relative to the reinforcing fibers of each of said two layers, and with the angle between the optical fibers and the reinforcing fibers of one of said two layers being substantially, equal to the angle between the optical fibers and the reinforcing fibers of the other of said two layers.

10. A composite material as claimed in claim 9, wherein the composite material is formed into a component having a surface which is subject to the greatest tensile load, and wherein the optical fibers and said two adjacent layers are located adjacent said surface having the greatest tensile load.

11. A composite material as claimed in claim 10, wherein the number of layers of reinforcing fibers is less than or equal to 16, and which does not include any substantial reinforcement on the rear surface therof, whereby the material is free to flex.

12. A composite material as claimed in claim 9 or 10, wherein the two adjacent layers of reinforcing fibers are parallel to one another and the optical fibers are substantially perpendicular to those layers of reinforcing fibers.

13. a composite material as claim 9, 10 or 11, wherein each optical fiber, includes a damage sensing portion which comprises first and second parts alternating witb one another, with the second parts having a reduced diameter relative to the first parts so as to provide substantial stress concentrations and sufficiently weaken the optical fiber to reduoe the fracture strength of the optical fibers, the diameter of the second parts being selected, to give a desired damage sensitivity.

14. A composite material as claimed in claim 9, wherein each optical fiber includes a damage sensing portion, which comprises first and second parts alternating with one another and transition parts extending between the first and second parats, with the second parts having a reduced diameter relative the first parts so as to provide substantial stress concentrations and sufficiently weaken the optical fiber to reduce the fracture strength of the optical fibers, the diameter of the second parts is selected to give a desired degree of damage sensitivity, and the transition parts are generally frustro-conical and such as to lock the damage sensing portions into the polymer.

15. A composite material as claimed in claim 14, wherein the transition parts are such as to provide stress concentrations, giving a desired local increase in the loading on the damage sensing portions.

16. A composite material as claimed inclaim 14 or 15 wherein the transition parts are such as to provide minor perturbations and/or cracking of the surfaces of the damage sensing portions, to give a desired reduction in the fracture strength of the damage sensing portions.

17. A fiber reinorced composite material, which comprises:
a plurality of layers of reinforcing fibers, with the reinforcing fibers of each of two adjacent layers extending in one within that layer, and with the reinforcing fibers of the two layers being at an angle to one another, and a polymer binding the reinforcing fibers together;
a plurality of optical fibers extending generally parallel to one another and spaced apart from one another between said two layers, with the optical fibers extending perpendicularly to the reinforcing fibers of one of said two layers.

18. A composite material as claimed in claim 17, wherein the composite material is formed into a component having a surface which is subject to the greatest tensile load, and wherein the optical fibers and said two layers are located adjacent said surface having the greatest tensile load.

19. A composite material as claimed in claim 9, wherein the optical fibers are volume backscattering optical fibers.

20. A fiber reinforced composite material, which comprises:
a plurality of layers of reinforcing fibers, and a polymer binding the layers of reinforcing fibers together;
a plurality of volume backscattering optical fibers located between two adjacent layers of reinforcing fibers and extending across a predetermined area, with the optical fibers comprising a first group of optical fibers which extend across one edge of a predetermined area to a second, generally opposite edge of the predetermined area, and a second group of optical fibers which extend across said second, generally opposite edge to said one edge and which are interdigitated with the first group optical fibers.

21. A composite material as claimed in claim 20, which is formed into a component having a surface, which is subject to the greatest tensile load, and wherein the two layers of reinforcing fibers and the optical fibers are located adjacent said surface having the greatest tensile load.

22. A composite material as claimed in claim 19, wherein the first and second groups of optical fibers extend across a predetermined area, with the first group of optical fibers extending across one edge of the predetermined area to another, generally opposite edge of the predetermined area, and with the second group of optical fibers extending across said opposite edge to said one edge, and being interdigitated with the first group of optical fibers.

23. A composite material as claimed in claim 17, wherein the optical fibers comprise volume backscattering optical fibers, and the first and second groups of optical fibersi extend across a predetermined area, with the first group of optical fibers extending across one edge of the predetermined area to another, generally opposite edge of the predetermined area, and with the second group of optical fibers extending across said opposite edge to said one edge, and being interdigitated with the first group of optical fibers.

24. A composite material as claimed in claim 22 or 23, which is formed as a component having a surface, which is subject to the greatest tensile load, and wherein the optical fibers and said two layers of reinforcing fibers are located adjacent said surface, having the greatest tensile load.

25. A composite material as claimed in claim 9, wherein each optical fiber has one end adapted for connection to a light source and a photodetector, and another end which is highly reflecting.

26. A composite material as claimed in claim 25, wherein the optical fibers are arranged in a grid, with a first group of fibers extending in one direction and a second group of fibers extending in another direction and intersecting the first group of fibers, wherein the two groups of fibers are sufficiently spaced to avoid excessive microbend loss and damage to the fibers.

27. A composite material as claimed in claim 19, 20, 22 or 25, wherein, for each optical fiber, there is provided a light source, a directional coupler coupling the light source to the respective optical fiber, a reference photodetector connected to the directional coupler for detecting the magnitude of light transmitted to the optical fiber from the light source, and a return signal photodetector connected to the directional coupler for detecting the returned light emitted from the optical fiber.

28. A composite material as claimed in claim 19, 20, 22 or 25, which comprises a light source, a directional coupler having an input connected to the light source and an output, a DMD which is connected to the optical fibers and to the directional coupler, a reference photodetector connected to the directional coupler for detecting the magnitude of light transmitted to the DMD, and a return signal photodetector connected to the directional coupler for sensing the magnitude of the return light from an optical fiber through the DMD, whereby the light source and the DMD operate together to illuminate the optical fibers individually and successively, and the DMD and the return signal photodetector operate to interrogate the optical fibers individually and successively.

29. A composite material as claimed in claim 19, 20, 22 or 25, wherein each of the optical fibers includes a portion, which comprises first and second parts alternating with one another, with each second part having a smaller diameter than the first parts, the diameter of the second parts being selected to give a desired damage sensitivity.

30. A composite material as claimed in claim 27, wherein each of the optical fibers includes a portion, which comprises first and second parts alternating with one another, with each second part having a smaller diameter than the first parts to reduce the fracture strength of the optical fibers, the diameter of the second parts being selected to give a desired damage sensitivity.

31. A composite material as claimed in claim 28, wherein each of the optical fibers includes a portion, which comprises first and second parts alternating with one another, with each second part having a smaller diameter than the first parts to reduce the fracture strength of the optical fibers, the diameter of the second parts being selected to give a desired damage sensitivity.

32. A composite material as claimed in claim 9 or 10, which includes a light source, a directional coupler having an input connected to the light source and an output, a DMD connected to the output of the directional coupler and connected to the optical fibers, a reference photodetector conncted to the directional coupler for detecting the magnitude of the light from the light source, and a return signal photodetector connected to the directional coupler, for determining the magnitude of the return light from an individual optical fiber, the light source and the DMD operating together to illuminate the optical fibers individually and successively, and the DMD and the return signal photodetector operating to interrogate the optical fibers individually and successively.

33. A composite material as claimed in claim 32, wherein each of the optical fibers includes a portion which comprises first and second parts alternating with one another, with each second part having a smaller diameter than the first parts, the diameter of the second parts being selected to give the desired damage sensitivity.

34. A composite material as claimed in claim 33, wherein each optical fiber is a volume backscattering optical fiber, and the directional coupler is an asymmetric coupler, which couples the majority of the light backscattered from each individual optical fiber to the return signal photodetector and the majority of the light from the light source to each optical fiber in turn, and wherein the optical fibers comprise first and second groups of fibers extending across a predetermined area, with the first group of fibers extending across one edge of the predetermined area to another, generally opposite edge thereof, and with the second group of fibers extending across said another edge to said one edge, the first and second groups of fibers being interdigitated with one another.

35. A composite material as claimed in claim 9, wherein each damage sensing optical fiber includes a first end mounted for receiving illumination and a second end mounted for visual inspection, and which includes a plurality of reference optical fibers each of which includes a first end for receiving illumination and a second end for providing a reference light point, each second end of the reference optical fibers being associated and located adjacent a second end of a respective first-mentioned optical fiber.

36. A fiber reinforced composite material which comprises:
   a plurality of layers of reinforcing fibers and a polymer binding the reinforcing fibers together;
   a plurality of optical fibers extending between two adjacent layers of reinforcing fibers and across a predetermined area for detecting damage therein;
   a light source, a directional coupler having an input connected to the light source and an output, a DMD connected to the output of the directional coupler and to each of the optical fibers, a reference photodetector magnitude of the light from the light source, and a return signal photodetector connected to the directiona-4 coupler, for detecting the magnitude of return light back from each optical fiber, the light source and the DMD operating together to illuminate each of the optical fibers individually and successively, and the DMD and the return signal photodetector operating together to interrogate .the optical fibers individually and successively.

37. A composite material as claimed in claim 36, which is formed as a component with a surface, which is subject to the greatest tensile load, and wheerein the optical fibers and said two layers of reinforcing fibers are located adjacent said surface having the gratest tensile load.

38. A fiber reinforced composite material which comprises:
   a pIuralityof layers of reinforcing fibers and a polymeer binding the reinforcing fibers together;
   a pluralityof volume backscattering optical fibers extending, spaced apart from one another between two adjacent layers of reinforcing fibesrs, each optical fibesr including a damage sensing portion comprising a plurality of first parts, a plurality of second parts having a smaller diameter than the diameter of the first parts and alternating therewith, ad a plurality of transition parts extending between the first and second parts, the transition parts being such as to provide substantial stress concentrations and sufficiently weaken the optical fibers to give the optical fibers a reduced fracture strength relative to optical fibers of uniform diameter and similar material, and the transition parts locking the optical fibers to the composite material, whereby the optical fibers are subjected to the same strain as the compoeite mterial;
   illumination and interrogation means connected to both ends of each optical fiber, for alternately illuminating each end of each optical fiber, to determine the location of a fracture of the optical fiber.

39. An optical fiber which includes, a damage sensing portion comprising a plurality of first parts, a plurality of second parts having a smaller diameter than the diameter of the first parts and alternating therewith, and a plurality of transition parts extending between the first and second parts, the transition parts being such as to provide substantial stress concentrations and sufficiently weaken the optical fibers to give the optical fibers a reduced fracture strength relative to optical fibers of uniform diameter and similar material, and the transition parts being capable of locking the optical fibers to an object, whereby the optical fibers are subjected to the same strain as the object.

40. An optical fiber as claimed in claim 39, wherein a portion of the optical fiber, with a length considerably greater than each of the first parts, has a uniform diameter equal to the diameter of the first parts.

41. An optical fiber as claimed in claim 39 or 40, wherein some of the second parts have one second diameter, and others of the second parts have another second diameter different from said one second diameter.

42. A method of mounting optical fibers in a composite material, the method comprising:
   (a) providing a support surface with a plurality of pins defining the desired pattern for the optical fibers;
   (b) positioning optical fibers around the pins in the desired pattern;
   (c) placing a sheet with an adhesive surface onto the optical fibers, whereby the optical fibers adhere to the sheet;
   (d) removing the sheet with the optical fibers adhered thereto.

43. A method as claimed in claim 42, wherein the pins are frictionally mounted in bores in the support surface, whereby during step (c), the pins are depressed until they are flush with the support surface.

44. A method as claimed in claim 43, wherein after step (d), the sheet bearing the optical fibers is placed in a mold and laminated with other layers of reinforcing fibers to form a composite material with the optical fibers embedded therein.

45. A method as claimed in claim 43 or 44, wherein said sheet comprises a sheet of resin.

46. A method as claimed in claim 43 or 44, wherein said sheet comprises a pre-impregnated layer of reinforcing fibers.

47. A method as claimed in claim 1 or 7, wherein the transitional parts are formed with a generally frusto-conical shape.

48. A method as claimed in claim 47, wherein the etching is such as to form an uneven surface on the transitional parts, relative to the surfaces of the first and second parts.

49. A method as claimed in claim 1 or 2, wherein after step (b) the protective coating is removed.

50. A damage evaluation system for anobject, the damage evaluation system comprising a plurality of damage sensing optical fibers for bonding to the object, each of which optical fibers includes a damage sensing portion oomprising a plurality of first parts, a pluralityof second parts having a smaller diameter than the diameter of the first parts and alternating therewith, and a plurality of transition parats extending between the first and second parts, the transition parts being such as to provide substantial stress concentrations and sufficiently weaken the optical fibers, to give the optical fibers a reduced fracture strength relative to optical fibers of uniform diameter and similar material, and the transition parts being capable of locking the optical fibers to the object, whereby the optical fibers are subjected to the same strain as the object.

51. A damage evaluation system as claimed in claim 50, in combination with an object comprising a fiber reinforced composite material, which comprises a plurality of layers of reinforcing fibers and a polymer binding the reinforcing fibers together, with the optical fibers bound to the composite material by the polymer.

52. A damage evaluation system as claimed in claim 50 or 51, wherein the transitional parts are sufficiently abrupt to form said substantial stress concentrations.

53. A damage evaluation system as claimed in claim 50 or 51, wherein the transition parts are such as to include at least one of minor perturbations and cracking of the surfaces of the damage sensing portions to give a desired reduction in the fracture strength of the ptical fibers.

54. A damage evaluation system as claimed in claim 50 or 51, wherein the transition parts are generally frusto-conical.

55. A damage evaluation system as claimed in claim 50 or 51, wherein the composite material has a surface which is subject to the greatest tensile load, and wherein the optical fibers are located adjaacent to said surface subject to the greatest tensile load and are oriented to extend transversely across cracks commencing between reinforcing fibers adjacent said surface.

56. A damage evaluataion system as claimed in claim 50 or 51, wherein the optical fibers comprise a first group of optical fibers which extends across one edge of a pre-determined area to a generally opposite edge of the pre-determined area, and a second group of optical fibers which extend across said second, generally opposite edge to said one edge and which are intidigitated with the first group of optical fibers.

57. A damage evaluataion system as claimed in claim 50 or 51, wherein the optical fibers comprise volume backscattering optical fibers.

58. A damage evaluation system as claimed in claim 50 or 51, wherein, for eachoptical fiber, there is provided a light source, a directional coupler coupling the light source to the respective optical fiber, a reference photodetector connected to the directional coupler for detecting the magnitude of light transmitted to the optical fiber from the light source, and a return signal photodetector connected to the directional coupler for detecting the returned light emitted from the optical fiber.

59. A damage evaluation system as claimed in claim 50 or 5I, which includes a light source, a directional coupler having an input connected to the light source and an output, a DMD which is connected to the optical fibers and to the directional coupler, a reference photodetector connected to the directional coupler for detecting the magnitude of light transmitted to the DMD, and a return signal photodetector connected to the directional coupler for sensing the magnitude of the return light from an optical fiber transmitted through the DMD, whereby the light source and the DMD operate together to illuminate the optical fibers individually and successively, and the DMD and the return signal photodetector operate to interrogate the optical fibers individually and successively.

60. A damage evaluation systemn as claimed in claim 50 or 51, wherein for the sensing portion of each optical fiber, the first and second parts are of generally similara length to one another, with the transition parts being substantially shorter than the first and second parts.

* * * * *

UNITED STATES PATENT AND TRADEMARK OFFICE
CERTIFICATE OF CORRECTION

PATENT NO.   :  4,936,649
DATED        :  June 26, 1990
INVENTOR(S)  :  John D. Lymer et.al It is certified that error appears in the above-identified patent and that said Letters Patent is hereby corrected as shown below:

```
column 1, line 40:   Replace "and" by --an--;

column 2, line 7:    Delete "through";

column 2 line 23:    Replace "are for" by offer--;

column 4, line 33:   Replace "weakened" by --weaken the
                     optical fiber--;

column 10, line 11:  Replace "microms" by --microns--;

column 24, line 59:  Between "photodetector" and "magnitude"
                     insert --connected to the directional
                     coupler for detecting the--.
```

Signed and Sealed this

Twelfth Day of October, 1993

Attest:

BRUCE LEHMAN

Attesting Officer

Commissioner of Patents and Trademarks